US012086021B2

(12) United States Patent
Saxena et al.

(10) Patent No.: US 12,086,021 B2
(45) Date of Patent: Sep. 10, 2024

(54) CLUSTERING OF STRUCTURED LOG DATA BY KEY-VALUES

(71) Applicant: Sumo Logic, Inc., Redwood City, CA (US)

(72) Inventors: Udit Saxena, Mountain View, CA (US); Reetika Roy, Redwood City, CA (US); Ryley Higa, Honolulu, HI (US); David M. Andrzejewski, San Francisco, CA (US); Bashyam Tca, Walnut Creek, CA (US)

(73) Assignee: Sumo Logic, Inc., Redwood City, CA (US)

( * ) Notice: Subject to any disclaimer, the term of this patent is extended or adjusted under 35 U.S.C. 154(b) by 0 days.

(21) Appl. No.: 18/299,218

(22) Filed: Apr. 12, 2023

(65) Prior Publication Data

US 2023/0315558 A1    Oct. 5, 2023

Related U.S. Application Data

(63) Continuation of application No. 17/009,649, filed on Sep. 1, 2020, now Pat. No. 11,663,066.
(Continued)

(51) Int. Cl.
*G06F 16/00* (2019.01)
*G06F 11/07* (2006.01)
(Continued)

(52) U.S. Cl.
CPC ...... *G06F 11/0784* (2013.01); *G06F 11/0775* (2013.01); *G06F 11/0781* (2013.01);
(Continued)

(58) Field of Classification Search
CPC ............. G06F 11/0784; G06F 11/0775; G06F 11/0781; G06F 11/0787; G06F 16/211;
(Continued)

(56) References Cited

U.S. PATENT DOCUMENTS 7,890,543 B2    2/2011 Hunt et al.
10,025,673 B1 *  7/2018 Maccanti ............ G06F 11/1451
(Continued)

FOREIGN PATENT DOCUMENTS

| KR | 20170047856 | 5/2017 |
|----|-------------|--------|
| WO | 2021242291  | 12/2021 |
| WO | 2021242292  | 12/2021 |

OTHER PUBLICATIONS

"International Application Serial No. PCT US2020 048959, International Search Report mailed Jan. 7, 2021", 2 pgs.
(Continued)

*Primary Examiner* — Alex Gofman
*Assistant Examiner* — Suman Rajaputra
(74) *Attorney, Agent, or Firm* — Schwegman Lundberg & Woessner, P.A.

(57) ABSTRACT

Clustering structured log data by key-values includes receiving, via a user interface, a request to apply an operator to cluster log messages according to values for keys associated with the request. At least a portion of each log message comprises structured machine data including a set of key-value pairs. The method further includes receiving a log message and determining whether to include the log message in a cluster based at least in part on an evaluation of values in the structured machine data of the log message for the keys associated with the request. The cluster is included in a set of clusters. Each cluster in the set is associated with a different combination of values for the keys associated with the request. The method further includes providing, via the user interface, information associated with the cluster.

20 Claims, 32 Drawing Sheets

Related U.S. Application Data

(60) Provisional application No. 63/031,464, filed on May 28, 2020.

(51) Int. Cl.
| | | |
|---|---|---|
| *G06F 16/21* | (2019.01) | |
| *G06F 16/24* | (2019.01) | |
| *G06F 16/2455* | (2019.01) | |
| *G06F 16/25* | (2019.01) | |
| *G06F 16/35* | (2019.01) | |

(52) U.S. Cl.
CPC ........ *G06F 11/0787* (2013.01); *G06F 16/211* (2019.01); *G06F 16/24* (2019.01); *G06F 16/24553* (2019.01); *G06F 16/258* (2019.01); *G06F 16/358* (2019.01)

(58) Field of Classification Search
CPC .. G06F 16/24; G06F 16/24553; G06F 16/258; G06F 16/358; G06F 11/0751; G06F 11/3452; G06F 11/3495; G06F 11/3476; G06F 21/552; G06F 2201/86; G06F 2201/88; G06F 16/35; G06F 9/445
See application file for complete search history.

(56) References Cited

U.S. PATENT DOCUMENTS

| | | | |
|---|---|---|---|
| 10,817,487 B1 | 10/2020 | Probst | |
| 10,878,808 B1 | 12/2020 | Mathias et al. | |
| 11,321,158 B2 | 5/2022 | Saxena et al. | |
| 11,663,066 B2 | 5/2023 | Saxena et al. | |
| 11,829,189 B2 | 11/2023 | Saxena et al. | |
| 2006/0184529 A1 | 8/2006 | Berg et al. | |
| 2009/0210631 A1 | 8/2009 | Bosworth et al. | |
| 2011/0185234 A1 | 7/2011 | Cohen et al. | |
| 2014/0059017 A1 | 2/2014 | Chaney et al. | |
| 2016/0055191 A1 | 2/2016 | Joshi et al. | |
| 2016/0147816 A1* | 5/2016 | Cline .................. | G06Q 10/067 707/737 |
| 2017/0083396 A1 | 3/2017 | Bishop et al. | |
| 2017/0220663 A1 | 8/2017 | Zhao et al. | |
| 2017/0228460 A1* | 8/2017 | Amel .................... | G06F 16/248 |
| 2018/0102938 A1* | 4/2018 | Yoon .................... | G06F 16/358 |
| 2018/0129579 A1 | 5/2018 | Debnath et al. | |
| 2018/0232425 A1* | 8/2018 | Das ..................... | G06F 16/2471 |
| 2018/0285432 A1 | 10/2018 | Das et al. | |
| 2018/0324033 A1 | 11/2018 | Rath et al. | |
| 2019/0146763 A1 | 5/2019 | Gould | |
| 2019/0370347 A1* | 12/2019 | Levy .................... | G06F 16/355 |
| 2020/0012584 A1 | 1/2020 | Walters et al. | |
| 2021/0373990 A1 | 12/2021 | Saxena et al. | |
| 2021/0374153 A1 | 12/2021 | Saxena et al. | |
| 2022/0269554 A1 | 8/2022 | Saxena et al. | |

OTHER PUBLICATIONS

"International Application Serial No. PCT US2020 048959, Written Opinion mailed Jan. 7, 2021", 4 pgs.

"International Application Serial No. PCT US2020 048958, International Search Report mailed Nov. 30, 2020", 2 pgs.

"International Application Serial No. PCT US2020 048958, Written Opinion mailed Nov. 30, 2020", 5 pgs.

"U.S. Appl. No. 17/009,643, Notice of Allowance mailed Dec. 21, 2021", 9 pgs.

"U.S. Appl. No. 17/009,643, 312 Amendment filed Mar. 7, 2022", 3 pgs.

"U.S. Appl. No. 17/009,643, Supplemental Notice of Allowability mailed Apr. 4, 2022", 2 pgs.

"U.S. Appl. No. 17/009,649, Non Final Office Action mailed Apr. 21, 2022", 29 pgs.

"U.S. Appl. No. 17/009,649, Response filed Jun. 29, 2022 to Non Final Office Action mailed Apr. 21, 2022", 11 pgs.

"U.S. Appl. No. 17/009,649, Final Office Action mailed Sep. 30, 2022", 26 pgs.

"U.S. Appl. No. 17/009,649, Response filed Nov. 10, 2022 to Final Office Action mailed Sep. 30, 2022", 13 pgs.

"International Application Serial No. PCT US2020 048959, International Preliminary Report on Patentability mailed Dec. 8, 2022", 5 pgs.

"International Application Serial No. PCT US2020 048958, International Preliminary Report on Patentability mailed Dec. 8, 2022", 7 pgs.

"U.S. Appl. No. 17/009,649, Notice of Allowance mailed Feb. 9, 2023", 14 pgs.

He, "Clustering Categorical Data Streams", (Dec. 13, 2004), 25 pages.

Shindler, "Fast and Accurate k-means For Large Datasets", (Jan. 2011), 10 pages.

"European Application Serial No. 20937931.2, Response filed Feb. 7, 2024 to Extended European Search Report mailed Sep. 1, 2023", 9 pages.

"European Application Serial No. 20937206.9, Response filed Apr. 29, 2024 to Extended European Search Report mailed Oct. 13, 2023", 10 pages.

"U.S. Appl. No. 17/695,098, Notice of Allowance mailed Jul. 31, 2023", 13 pages.

"European Application Serial No. 20937931.2, Extended European Search Report mailed Sep. 1, 2023", 6 pages.

"European Application Serial No. 20937206.9, Extended European Search Report mailed Oct. 13, 2023", 6 pages.

"U.S. Appl. No. 17/695,098, Corrected Notice of Allowability mailed Oct. 31, 2023", 4 pages.

U.S. Appl. No. 17/009,649 U.S. Pat.No. 11,663,066, filed Sep. 1, 2020, Clustering of Structured Log Data by Key-Values.

U.S. Appl. No. 17/009,643 U.S. Pat. No. 11,321,158, filed Sep. 1, 2020, Clustering of Structured Log Data by Key Schema.

U.S. Appl. No. 17/695,098, filed Mar. 15, 2022, Clustering of Structured Log Data by Key Schema.

* cited by examiner

indexmsgtimespreadstats.p90, indexmsgtimespreadstats.p95,
indexmsgtimespreadstats.p99, indexretrievalcriticaldt, infersignaturedonetime,
initializationdt, inputmessaged, isaggregatequery, isbatchlessexecution,
iscomparequery, isinteractivequery, isstreamscaled, isstreamscaledaggregate,
kattaclientexception, kattacountdt,
kattacriticalpathtiming.kattatiminginfo.countcomputationtime,
kattacriticalpathtiming.kattatiminginfo.cpuqueuetime,
kattacriticalpathtiming.kattatiminginfo.docsretrievaltime,
kattacriticalpathtiming.kattatiminginfo.fetchtime,
kattacriticalpathtiming.kattatiminginfo.fieldextractiontime,
kattacriticalpathtiming.kattatiminginfo.hitscomputationtime,
kattacriticalpathtiming.kattatiminginfo.ioqueuetime,
kattacriticalpathtiming.kattatiminginfo.piangenerationtime,
kattacriticalpathtiming.kattatiminginfo.prepqueuetime,
kattacriticalpathtiming.kattatiminginfo.searchercreationtime,
kattacriticalpathtiming.kattatiminginfo.streamtupleconversiontime,
kattacriticalpathtiming.kattatiminginfo.throttledsleeptime,

| | | | |
|---|---|---|---|
| 3 | 442E1D60EC7B6A21 | statusmessage = Finished successfully : (10, 100.0%)<br>callermodule = unknown : (10, 100.0%)<br>customerid = ▬▬▬▬▬ : (10, 100.0%) | 10 |
| 4 | D99D984988CF0F09 | statusmessage = Finished successfully : (5, 100.0%)<br>callermodule = BatchingIT : (4, 80.0%)<br>customerid = ▬▬▬▬ : (5, 100.0%) | 5 |
| 5 | 2B9C23F6A7B95769 | statusmessage = Finished successfully : (1201, 100.0%)<br>callermodule = autoview : (1201, 100.0%)<br>customerid = ▬▬ : (347, 28.89%) | 1201 |

☑ _signature_id @ 1
☑ callerModule @ 1
☑ customerid @ 1
☑ statusMessage @ 1
☑ Message @ 1

Hidden Fields

☐ Name @ 4
☐ _budget @ 1
☐ Collector @ 4
☐ Size @ 0 slowdownReason : "UnKnown",
isInteractiveQuery : false,
exitCode : 0,
statusMessage : "Finished successfully",
isAggregateQuery : true,
isStreamScaledAggregate : true,
isStreamScaled : true,
callerModule : "unknown",
callerSessionId : "FFFFFFFFFFFFFFFFF",
savedSearchIdOpt : "None",
autoviewId : "None",
numViews : 1,
paramCt : 0,
rangeDt : 300000,
processDt : 300000,
kattaDt : 0,
mixDt : 4,
indexRetrievalCriticalDt : 4,
kattaCountDt : 0,
executionendtime, executionstarttime,
exitcode, finalquery, fragmentedindicesct,
gctime, hitct, indexbatchct, indexct,
indexcfafterbloomfilter, indexhitct,
indexmsgtimespreadstats.p100,
indexmsgtimespreadstats.p50,
...

| | | |
|---|---|---|
| 5 | IsleeperQueryDuration10 IKattaCorrectenssSleeperQuery KattaSleeper1in1 | count | 1 |
| 6 | IsleeperQueryDuration5 IKattaCorrectenssSleeperQuery KattaSleeper1in1 | count | 1 |
| 7 | IsleeperQueryDuration5 IKattaCorrectenssSleeperQuery KattaSleeper1in1000 | count | 1 |
| 8 | IsleeperQueryDuration10 IKattaCorrectenssSleeperQuery KattaSleeper1in10 | count | 1 |

FIG. 4G (Cont.)

☐ Source Host a  10
☐ Source Name a  2

: true, "isStreamscaled" : true, "callerModule" : "report", "caller Session Id" : "...", "savedSearchIdOpt" : "None", "autcviewId" : "None", "numViews" : 81, "paramCt" : 0, "rangeDt" : 900000, "processDt" : 900000, "kattaDt" : 6402, "mixDt" : 143, "indexRetrievalCriticalDt" : 354, "kattaCountDt" : 0 "kattaSearchDt" : 0, "kattaDetailsDt" : 0, "streamSortDt" : 0, "kattaNonAggregateQueryDt" : 0, "kattaNonAggregateSortDt" : 0, "kattaQueryDt" : 6402, "kattaTimingInfo" : {"totalTime" : 18962, "fetchTime" : 342, "countComputationTime" : 0, "hitsComputationTime" : 253, "docsRetrievalTime" : 10240, "fieldExtractionTime" : 285, "planGenerationTime" : 338, "streamTupleConversionTime" : 932 "tupleProcessingTime" : 4153, "searcherCreationTime" : 21, "prepQueueTime" : 20, "icQueueTime" : 0, "cpuQueueTime" : 788, "throttledSleepTime" : 0}, "kattaCriticalPathTiming" : {"totalTime" : 6402, "timeSpentOnFailedRequest" : 0, "streamTupleConversionTime" : 0, "workQueueTotalTime" : 6402, "serverRoundTripTime" : 6400, "kattaTimingInfo" : {"totalTime" : 6365, "fetchTime" : 0, "countComputationTime" : 0, "hitsComputationTime" : 68,

| | | | |
|---|---|---|---|
| 3 | eventdata_targetusername = ""<br>eventdata_logontype = "10"<br>eventdata_processname = " C:\Windows\System32\svchost.exe" | 0.88098 | 6.28% (14/223) | 0.48% (14/2,899) |
| 4 | eventdata_targetusername = ""<br>eventdata_logontype = "10"<br>eventdata_processname = " C:\Windows\System32\svchost.exe" | 0.79545 | 5.38% (12/223) | 1.14% (33/2,899) |
| 5 | eventdata_targetusername = ""<br>eventdata_logontype = "10"<br>eventdata_processname = " C:\Windows\System32\svchost.exe" | 0.76051 | 8.07% (18/223) | 2.28% (66/2,899) |

FIG. 5C (Cont.)

| _signature_id | _schema | _count |
|---|---|---|
| 76543ZYXWVU321 | activesignaturect, analyticstiersqueried, autoviewid, bloomfilterresult.dontknow, bloomfilterresult.maybe, bloomfilterresult.no, bloomfilterresult.notreturned, bloomfilterresult.outoftimerange, bloomfiltertimetaken, buildenginedt, cachect, callermodule, callersessionid, childqueriessessionids, customerid, defragmentedindicesct, ett, executiondt, executionendtime, executionstarttime, exitcode, finalquery, fragmentedindicesct, gctime, hitct, indexbatchct, indexct, indexctafterbloomfilter, indexhitct, indexmsgtimespreadstats.p100, indexmsgtimespreadstats.p50, indexmsgtimespreadstats.p75, indexmsgtimespreadstats.p90, indexmsgtimespreadstats.p95, indexmsgtimespreadstats.p99, indexretrievalcriticaldt, infersignaturedonetime, initializationdt, inputmessagect, isaggregatequery, isbatchlessexecution, iscomparequery, isinteractivequery, isstreamscaled, isstreamscaledaggregate, | 172 |

FIG. 6A

| # | Time | _kv | _schema | _signature_id |
|---|------|-----|---------|---------------|
| 1 | 05/18/2020 15.08.25.132-0700 | [LOGTYPE=TELEMETRY.CUSTOMER] [hostId= ---12345ABC module=STREAM] [localUserName=stream] [logger=stream.internals.EttPlansCache$] [thread=MTP-RawOutputProcessor-Session-9.876543210-1]<br><br>[auth=User : user2@demo.com:00000045678: 01234XYZ :false:Defa ultSumoSystemUser:12:USENAME_PASSWORD] [sessionId=S4568EFGH ] [callerModule=report] [remote_ip=98.76.54.321 ] [web_session= node456 ] [api_session=ASXY123 ] [remotemodule=dashbord] [execution_interface=UI] [query_flags=] | api_session, auth, callermodule, execution_interface, hostid, localusername, logger, logtype, module, remote_ip, remotemodule, sessionid, thread, web_session | 1234567ABCDEFG |

FIG. 6B

| # | _signature_id | _schema | _count |
|---|---|---|---|
| 1 | 12345ABCDE | auth, hostid, localusername, logger, logtype, module, remotemodule, sessionid, thread, callermodule | 98 |

FIG. 7

☑ orgid a
☑ usercode a
☑ userid a
☑ Message a

Hidden Fields
☐ Name a                10
☐ _budget a              1

User   UNKNOWN   User :        : DefaultSumoSystemUser
00               000000078B9CD5 : false : DefaultSumoSystemUser : 5 : UNKNOWN

CLUSTERING OF STRUCTURED LOG DATA BY KEY-VALUES

CROSS-REFERENCE TO RELATED APPLICATIONS

This application is a Continuation Application under 35 USC § 120 of U.S. patent application Ser. No. 17/009,649, entitled "Clustering of Structured Log Data by Key-Values," filed on Sep. 1, 2020, which claims the benefit of U.S. Provisional Patent No. 63/031,464, filed May 28, 2020, and entitled "Structured Log Analysis," all of which are incorporated by reference in their entirety.

BACKGROUND

Increasingly, logs for modern applications and cloud infrastructure are in structured formats. This provides various challenges to existing log analysis systems designed to analyze unstructured log data, limiting their efficacy.

BRIEF DESCRIPTION OF THE DRAWINGS

Various embodiments of the invention are disclosed in the following detailed description and the accompanying drawings.

FIGS. 4A-4G illustrate an embodiment showing interoperability of the LogReduce Keys and LogReduce Values operators.

FIG. 6A illustrates an embodiment of a JSON key schema.

FIG. 6B illustrates an embodiment of a KV key schema.

FIG. 7 illustrates an embodiment of a user interface.

DETAILED DESCRIPTION

Figure 1:
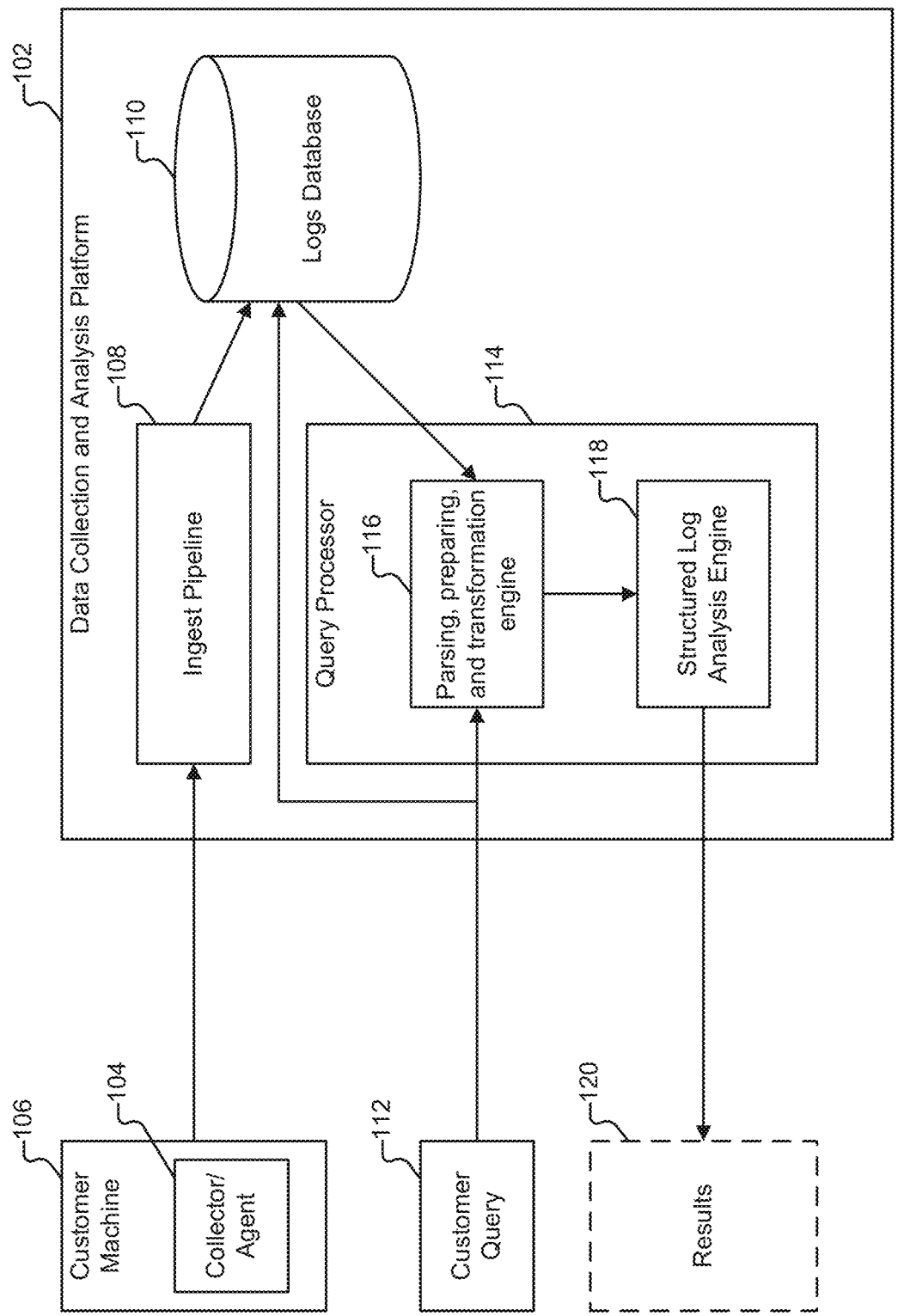
FIG. 1 illustrates an embodiment of an environment in which structured log analysis is performed.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Many existing log analysis systems are designed to analyze unstructured data, for example, in order to perform text analysis to infer, derive, or otherwise determine the structure of the unstructured data (e.g., by attempting to perform structure matching based on string similarity). Increasingly, more and more logs are being generated in structured formats. However, existing string-based log analysis systems (using, for example, printf( )-oriented algorithms) may not be optimized for processing structured data, resulting in potentially lower performance from both the perspectives of throughput (e.g., logs-per second) and quality (e.g., user-judged quality of the resulting patterns), which can make analysis and querying of structured log data difficult.

For example, there is an increasing trend in software development to use formats such as JSON (JavaScript Object Notation) for logging. For example, JSON logs are becoming increasingly common, such as for modern applications that run natively on public clouds. However, such log data already has a structure imposed at write time, and analyzing it using an existing system designed, optimized, tuned, and intended for automatically extracting structure from a pile of unformatted strings can lead to issues in which the determined structure does not match the actual structure of the structured log data, which can lead to incorrect results when performing querying of the log data, as well as performance issues. Thus, the use of JSON or other structured formats in modern applications and cloud (AWS, GCP, Azure) IaaS (e.g., S3) and PaaS (e.g., RDS) logs may limit the value of existing log analysis techniques designed to analyze unstructured logs. For example, existing string-based systems may incorrectly cluster together JSON data according to a structure template that does not match the structure/schema of the actual log data. As another example, determining the structure of log data may include determining, over a set of printf-style log data, what portions are static (e.g., fields that are the structural elements), and what are variable components (e.g., values). This may lead to existing string-based analysis systems having value fields as non-wildcarded strings (e.g., incorrectly determining that a value is a field/key).

Existing string-based log analysis systems may also suffer performance degradation because JSON logs, which are typically machine generated and are not designed or formatted for human consumption, may be considerably longer than typical printf-style logs, and the algorithms for deriving structure may run into scalability and performance issues when attempting to process such structured records. These are potential failure modes for end users attempting to query the structured log data using such existing string-based analysis systems.

The following is one example of the problems that would be encountered using existing systems (that are tuned for inferring structure from unstructured data) to analyze structured data. Suppose that a log includes an address (including city, state, street, zip), a name, as well as a date. Suppose that this log has the date in the US date format. Suppose that another log has the exact same address, name, and date, but the date is in the European date format, in which the months, date, and year are in different positions. Here, the date is the same, but it is in a different order. Existing systems for analyzing unstructured data, which treat logs as strings, and perform string similarity analysis, may be sensitive to changes in the order of presentation, even though it does not actually change the underlying data. This sensitivity to order would cause the existing system to incorrectly not match the dates. In contrast, as will be described in further detail below, the structured log analysis techniques described herein are structure-aware (e.g., aware of key-value structure present in the logs being analyzed) and will match based on structure, which would result in correctly matching on the address. For example, the structured log techniques described herein are aware of the structure of the data, and are able to line up the different key-value pairs to determine matches, regardless of their actual position or ordering within the log. Thus, for example, the structure-aware log analysis techniques described herein are able to align the street of one log with the street of another log, even if the streets appear in different positions of the two logs. The structured log techniques would be invariant to such ordering as they have additional information about that structure of the fields. For example, for two logs with the same set of keys, the techniques described herein, which include techniques for clustering structured log data by key schema, would match the two logs together based on the combination of keys present in the logs, even if the keys are in different positions in the log, while an existing string-based system may determine that the two logs have different structures because the text for those keys are in different positions.

Thus, trying to analyze structured log data using existing string similarity techniques for unstructured log data can lead to determinations of structures that do not match the actual structure of the structured log data, and may cause performance issues where the text similarity algorithms are unable to converge on clusters of structures.

It is anticipated that structured machine data log data ingestion will steadily increase whether from Kubernetes or otherwise. The structured log analysis techniques described herein (also referred to herein as "Structured LogReduce") enable end users to readily interpret the structured machine data for operational troubleshooting.

Using the techniques described herein, the structure imposed on log data at write time can be exploited at read/analysis time, and improved analysis and querying of structured log data is provided. For example, using the LogReduce Values operator described herein, users may see logs clustered or anomalies detected based on the values of the structured data (e.g., values of the JSON log data), which is in contrast to existing systems used to analyze unstructured data, which are tuned to perform structure inference, and in some cases disregard values. Here, using the LogReduce Values operator, users are able to cluster by values (while in some cases ignoring structure), in order to, for example, figure out what are the related loglines based on the values that are appearing. In this way, a user can determine that there is a set of values that are somehow related to each other and may be clustered together.

Using the techniques described herein, process flows are provided for clustering structured log data in a variety of ways that also facilitate exploration and investigation of the structured log data. In various embodiments, this includes clustering structured log data by key schema, clustering structured log data by values, and facilitating investigation and exploration into determining explanations for the presence of structured log data that meet some type of condition or criteria.

As used herein, "key schema" and "key-value" are two different example representations of structured data. In the example case of JSON:

1. Key schema: the set of string keys in a given JSON object. In some embodiments, nested keys may be "flattened" into this scheme with a delimiter, e.g., a "userId" key under a nested "userInfo" object could be "userInfo.userId."
2. Key-Value: for homogenous key schema, this may convert the data to tabular form, with, for example, logs as rows and JSON keys as columns. Heterogeneous schema can be addressed by taking the union of key schema and adding "NA/Null" values, or other special-casing schemes.

Performing structured log analysis by clustering by key schema and key-values (using, respectively, the LogReduce Keys and LogReduce Values operators described herein) facilitates summarization of structured logs, where, for example, a user is able to approximate the experience of skimming the full log corpus looking for interesting patterns that might provide a jumping off point for further investigation. Using the structured log analysis techniques described herein:

Users are provided the option to cluster by key schema

Cluster by values may be performed in the case of different key schema the quality of the resulting clustering may be evaluated Clusters may be represented in a variety of ways to the user. The degree of intra-cluster variation of each column may be captured (e.g., ranging from constant to max entropy)

The user may see outlier rows, or rows which have ≥1 outlier value.

As will be described in further detail below, the structured log analysis techniques described herein further include a "LogExplain" operator that facilitates investigation and exploration of structured logs. Suppose, for example, that a user has a (more or less) tabular dataset: logs are rows, and parsed values (e.g., JSON) are the columns. As will be described in further detail below, using the LogExplain operator described herein, the user may specify some test predicate which can be applied to each row/log (e.g., "isFailed=true"), where this test predicate is used to partition the dataset into disjoint test and control sets. The LogExplain operator then finds "explanations" amongst the other columns that best distinguish the test set from the control set. In some embodiments, this can be thought of as similar to identifying highly salient features for supervised binary classification with test/control set membership as the class labels.

As one example application, suppose that there are structured logs that summarize performance, status, and fine-grained execution details of search jobs. In this setting, engineers often want to troubleshoot failing or unacceptably slow searches, which can be encoded as the test predicate to the LogExplain operator described herein. In many cases, these failures may be concentrated with respect to either a specific customer (e.g., due to unusual query patterns) or due to general load, and these signals may be identifiable via a modeling or algorithmic approach. In some embodiments, this capability may be considered as a form of automating a search for columns and values which are significantly correlated with the user-defined test predicate.

As will be described in further detail below, the ability to perform such processing may be invoked via operators that an end user is able to enter as user input (e.g., via a UI (user interface)) to a structured log analysis system (such as that shown in FIG. 1). The structured log analysis techniques may be used to analyze log data that is completely structured data, as well as log data that is in a hybrid format, which includes, for example, a printf-style log that has a payload of structured data. As will be described below, the operators may be interoperable, and provide summary analytics over structured data sets.

FIG. 1 illustrates an embodiment of an environment in which structured log analysis is performed. In this example, data collection and analysis platform 102 (also referred to herein as the "platform" or the "system") is configured to ingest and analyze machine data (e.g., log messages and metrics) collected from customers (e.g., entities utilizing the services provided by platform 102). End users may also query platform 102 in order to gain insight into their log data.

In this example, collectors (e.g., collector 104 installed on machine 106 of a customer) send logs to the platform over a network (such as the Internet, a local network, or any other type of network, as appropriate); customers may also send logs directly to an endpoint such as a common HTTPS (Hypertext Transfer Protocol Secure) endpoint. Collectors can also send metrics, and likewise, metrics can be sent in common formats to the HTTPS endpoint directly. As used herein, log messages and metrics are but two examples of machine data that may be ingested and analyzed by platform 102 using the techniques described herein. In this example, the collected raw log data includes structured data, examples of which are described above and throughout. In this example, machine 106 has installed collector agent software that is configured to collect machine data from one or more sources (which may be collected from machines other than machine 106). The collector/agent 104 may also be configured to interrogate machine 106 directly to collect raw log/machine data.

Customers sometimes may prefer not to use the collector software (e.g., provided by the operator of the platform) but instead send logs directly to the HTTPS service endpoint; this may be utilized in situations where resources might be too constrained to install the collector software (e.g., mobile phones), or where software installation is not possible (e.g., AWS Lambda).

As shown in this example, the raw machine data is ingested by ingest pipeline 108, which, as one example, is implemented as a service receiver cluster. In some embodiments, ingest pipeline 108 operates behind a load balancer. In this example, logs are accumulated by each receiver into bigger batches before being sent to a message queue. In some embodiments, once committed to the message queue, the ingest pipeline acknowledges the successful receipt of the raw machine data to the sender. In this example, after ingestion, the collected logs are stored to logs database 110.

A customer may interact with platform 102 (over a network such as the Internet), for example, by performing queries (e.g., customer query 112) to gain insight into their logs. In one embodiment, the query processor is implemented on the platform via a microservices architecture, where different services may take customer query input and call other services to retrieve and process the log data. In this example, suppose that a customer would like to gain insight into the structured log data. The platform allows the customer to perform queries to explore structured log data and/or to explain observed outliers in the structured log data. In some embodiments, the end user may indicate what type of structured log analysis they would like to perform by selecting (e.g., via user input) certain types of operators to perform on structured log data. Examples of structured log analysis operators are described in further detail below. In this example the customer query may be routed to a logs database 110 and/or query processor 114, which is configured to process queries to platform 102.

As shown in this example, customer query 112 is processed by parsing, preparing, and transformation engine 116. In one embodiment, engine 116 uses various analytics operators to "massage" or otherwise transform data into a tabular format, as well as highlight fields/features of interest for the user. The following queries are examples of such parsing and transformation:

- Log Parsing: _sourceCategory=/libertymutual/*/ matcher and "CTICall{"
  |parse "callIds[UUI]=*," as UUI
  |logreduce values on UUI
  and
- JSON Parsing: _sourceCategory="aws/cloudtrail/production" and _collector="AWS"
  |json "eventName", "eventSource", "awsRegion", "userAgent", "userIdentity.type",
  "managementEvent", "readOnly"
  |logreduce values on "eventName", "eventSource", "awsRegion", "userAgent", "userIdentity.type", "managementEvent", "readOnly"

In this example, the parsing, preparing, and transformation engine 116 evaluates the incoming query 112 to determine what logs in logs database 110 are of interest. Engine 116 then parses, prepares, and/or transforms the relevant log data (e.g., structured log data in this example) for analysis, according to the query. For example, engine 116 is configured to perform structured parsing on input raw structured log data for input to downstream operators, such as those described herein.

In some embodiments, the structured parsing operation takes an unstructured data feed and allows users to use a query language to parse and output structured data in the form of a table. For example, the input data could be JSON/CSV formatted or be a mixed representation using several formats. In some embodiments, the output is a table format with the columns representing the attributes of interest and are ready to be fed into downstream operators explicitly for log analysis, such as the operators executed by structured log analysis engine 118, described in further detail below. In one embodiment, engines 116 and 118 are implemented via complexes of code/classes (e.g., writing in the Scala programming language), which are executed when performing a query (e.g., by the query processor).

In some embodiments, this phase of structured parsing includes executing an operator to aid in structured log analysis. This operator facilitates reducing structured logs to clusters of schemas that the user is interested in, and is a tool to aid in structured log parsing. In some embodiments, this operator facilitates hard-clustering based on key schema. A user may use this operator to filter structured logs to those with a schema of interest. In some embodiments, extracting and clustering on key-schema is performed as part of the LogReduce Keys operator (described in further detail below), where additional filtering down to a schema of interest may also be performed by the LogReduce Keys operator by leveraging engine 116 to perform the filtering.

In some embodiments, this operator is a streaming operator that takes as input a structured log line (e.g., JSON log line) and parses (e.g., JSON parses) the line up to a user-specifiable depth and outputs the log line and two additional columns. One column contains a comma separated list of the keys of the flattened object up to a user-specified depth in lexicographic order. Another column contains the hash of the list of keys. This hash value is consistent across logs which have the same schema and can be used to filter out the logs with the same schema (e.g., using an operator to cluster logs by key schema, described in further detail below). In some embodiments, the process is automated using "quicklinks" in the output logs to remove the burden of writing the query from the user. In some embodiments, quicklinks are a feature for users to easily open a new pre-defined search of interest. For example, in this case, the quicklink redirects the user to a new search that is a drill-down having logs with the same JSON schema/belonging to the same cluster. This assists the user in investigating the logs from a particular cluster easily without the overhead of writing a new query themselves. As one example, suppose that a user runs the following query:

_sourceCategory=aws/cloudtrail
|logreduce keys which, as will be described in further detail below, generates signatures of clusters of key-schema, and the user sees a signature of interest which has error keys in the signature. The system may generate a quicklink that the user clicks on to open a new search with a drill-down query such as the following:

_sourceCategory=aws/cloudtrail
|logreduce keys noaggregate
|where_signature_id="some_hashed_hex_id"

(In some embodiments, in the above, the "noaggregate" option for logreduce keys is used to return LogReduce results as raw messages. Using this option may disable the aggregation process that runs by default—this may be used to support drill-down support, where it may be desired to retrieve the raw logs which maych some particular schema).

This example process of filtering out logs can be understood as a step in the log analysis workflow where data is cleaned based on schema. In some embodiments, cleaning the data includes taking a set of logs with varying schema and filtering down to a homogeneous schema set. This results in data that is easier to analyze/process further because it can be assumed that the data is uniform in terms of the keys present and their meanings. The data can then be fed downstream for other structured log analysis operations. For example, structured logs with the same key schema may be clustered together based on having the same hash value.

In this example, the processed structured log data is then analyzed by structured log analysis engine 118, which provides results 120 in response to the customer query. In some embodiments, structured log analysis engine 118 is configured to perform clustering of structured logs (e.g., clustering by key schema and/or clustering by key-values), and facilitate drilling down into the clusters. In this example, structured log analysis engine 118 is also configured to generate frequent explanations in a test condition (e.g., failure/outage) versus a normal condition. In some embodiments, this also provides the functionality of further drilling down to see subsets of data fulfilling a generated explanation. As will be described in further details below, such structured log analysis may be invoked via a set of operators, which may be used in a standalone manner or in an interoperable manner.

As one example of analyzing structured log data, suppose that a querying system is being monitored. Each time a user runs a query, a log is generated. The log includes rich, structured information about the query that was run. At any given time, some of these queries might fail, take too long, or otherwise go wrong. Having such logs may be critical in determining how a query engine is monitored and troubleshooted. In this example, the logs are captured in a structured way.

Suppose that such a structured log were processed by an existing string-based analysis engine that is attempting to infer the structure of an already structured log. While the existing system may make correct inferences in guessing that certain pieces of data are values, it may also make errors in inferring the structure, for example, by missing that a field is a key (structure) and instead treating it as a value (non-fixed portion of the log data). As another example, the existing string-based log analysis engine may miss the closing brackets of the JSON data. This is due to the existing system not being optimized for structured log data.

In some embodiments, using the structured log analysis techniques described herein, if hybrid raw log data is received, the portion of the raw log data with the structured data of interest is parsed out (e.g., using an appropriate parser). With respect to hybrid logs, the logs may also have more complex nested structures. For example, one entity may wrap all of their logging into JSON data that is like a transport package. In this case, the information of interest may be in a single field of the JSON log, with various metadata (e.g., where the log came from and how it was captured) being in a wrapper of the outer JSON. The one JSON field has the actual content. However, the inner JSON field may be an unstructured printf string or structured JSON object itself. The entity may be only interested in what is in the inner JSON object, in which case parsing may be performed in order to perform exploration on the inner JSON object. If the log is generated directly in a structured format (e.g., JSON, CSV, KV, etc.), such processing need not be performed. After parsing (if needed), the structured log data may then be analyzed using the operators described herein. The parsing may be performed by a user. The parsing may also be performed automatically by the structured log analysis platform, where the platform is configured to automatically detect structured data (e.g., to auto-detect JSON data or structured data of other formats) in collected raw logs and parse out the structured data. For example, the platform may include a format detector to detect the format of the structured data in a log, where the platform then automatically selects an appropriate parser to apply for the detected format. In some embodiments, the format detection and parsing described in the above example are performed by parsing, preparing, and transformation engine 116.

The structured log data may then be provided as input for clustering to the operators described herein. In some embodiments, determining the input set of log data may also include applying a time range constraint on input log data.

As described above, an end user may delve into their structured log data by specifying or invoking certain operators in their queries. In some embodiments, platform 102 may provide summary analytics over structured data sets through three operators that are interoperable. For example, as will be described in further detail below, using the operators described herein, the following structured log analysis may be performed to address various problems that are experienced in various use cases (such as DevOps use cases and security use cases for User and Entity Behavior Analytics (UEBA)):

(1) Culling noise through the "LogReduce Keys" operator by looking at a set of records and identifying the unique set of combinations across those fields called key schema (i.e., identifying the fixed structure of the fields) mapped to frequency called count (aka frequency of patterns) with, for example, deltas presented at the end of the schemas (e.g., the last 2 rows);

(2) Clustering by finding logs similar to each other through the "LogReduce Values" operator with a frequency analysis so that users can engage in rapid exploratory testing of hypotheses across the landscape (as well as over time) and delve deeper via the quicklinks into the underlying subset of data; and (3) Providing an explanation system by identifying outliers through the "LogExplain" operator by getting to an answer quickly through a test condition application of: (a) surfacing the patterns: (b) providing a percentage of relevance determined by how often it appears in the test condition vs. a control group; (c) comparing the percentage that the pattern appears in each of the test condition vs. control via test coverage and control coverage; and (d) exposing the total count that the pattern appears in both the test condition and control (aka sample size).

In various embodiments, these three operators may be used independently or in a cascading manner, as they are interoperable and may be expressed through queries. Further, in various embodiments, these three operators may be applied to any log sources. For example, they may be applied to JSON (or CSV) log sources. They may also be applied to various other types of structured log sources. Other examples of structured log sources include key-value formatted logs, XML-formatted logs, etc.

These three operators may be particularly beneficial given that structured machine data tends to be quite verbose (versus unstructured, typically single line logs), where software assistance is generally needed to look at/interpret the structured machine data. In some embodiments, the operators described herein expedite and simplify this interpretation, and accelerate analysis and testing of hypotheses. Further, in some embodiments, the operators expose out the reasoning (versus a blackbox analysis stating something is anomalous but not transparently sharing why).

Further details regarding the LogReduce Keys Operator, the LogReduce Values Operator, and the LogExplain Operator follow.

LogReduce Keys Operator

As described above, in some embodiments, the LogReduce Keys operator, when invoked (e.g., expressed via a search query created by a user), is configured to cluster an input set of ingested structured log data according to key schema. This includes clustering structured log data by different combinations of keys. For example, different canonical key spaces or schema of the structured JSON data in a set of logs may be determined. In some embodiments, the most common (combination of) keys that are present in the input set of structured log data may be presented. Thus, platform 102 is able to provide to a user a way to group search results (of a log search query) according to key schema, such that the user may view/explore structured log messages grouped based on keys.

Providing the ability to cluster structured log data according to key schema provides various benefits and functionality to end users. For example, one reason that key schema might vary is that if a query request failed, there may be some error sub-data structure that provides an error code, error message, etc. (whereas logs for requests that did not fail might not have these keys present in their logs). Grouping JSON logs by schema—that is, into the schemas which contain error payloads and into the schemas which do not—is one example way to programmatically separate the failing and non-failing requests. That is, if there are different schema in the structured log data that represent different scenarios/situations (e.g., if there is one schema that represents a failing transaction and a different schema that is associated with a successful transaction), then the ability to cluster structured log data by key schema, as provided by the structured log analysis system described herein, can provide useful information, such as the raw frequency of the occurrence of different types of situations or events.

The input set of data can be narrow or broad in its scope. For example, an end user may know that a certain host or machine being monitored is emitting JSON logs, but may not know what kind of logs they are. Using the LogReduce Keys operator described herein, the structured log analysis platform can provide a high-level table of contents that indicate the different kinds of logs (e.g., according to key schema/combinations of keys) that are available to a user for further analysis and exploration.

Using the LogReduce Keys operator described herein, the different "flavors" of logs, identified or represented by the presence of different combinations of keys (i.e., key schema), may be determined, so that an end user may have an overview of the types of structured log data that is present. For example, the keys in the structured log data are identified by the platform and used to summarize the different types of key schema that are present in the data.

In some embodiments, the results of clustering an input set of structured log data by key schema is presented to a user via a user interface. The structured log analysis platform may present a summarized view of the different key schemas identified in the structured log data, where each key schema is associated with a corresponding cluster of logs that have that key schema. In this way, a user may see what are the different schema that are represented. In some embodiments, the different key schemas are prioritized. As one example, a first key schema whose cluster has more structured logs than a second key schema cluster may be prioritized ahead of the second key schema (i.e., the clusters, which are each associated with a unique key schema, or prioritized according to the count of the number of logs inside the cluster). In some embodiments, a number of logs present in each cluster (represented by a unique key schema) is presented. For example, based on the execution of the operator, the user may be presented information via the UI indicating that there are only two logs that have a certain key schema. The user may find this odd, and then further explore that cluster of logs as a hypothesis to further explore or investigate any issues. In some embodiments, the platform also provides links (also referred to herein as "quicklinks") to viewing the logs present in a key schema cluster. In this way, a user can view the actual raw logs that have a particular key schema.

One example of clustering by key schema is as follows. Structured log data is received (it may have been received directly in structured form, or extracted from a hybrid log, as described above). An appropriate parser consumes the log, and a structured map of keys to values is output. All of the keys in the particular set for the log are captured. In some embodiments, the values are disregarded. Thus, for the one message, only the keys have been parsed out. That set of keys then goes into a schema, and may be used to generate a signature, which is used to group the log message. That is, the signature for logs in a cluster may be computed based on the unique keys the group of logs in the cluster contain. The log is then matched to a cluster based on the signature identifier. In some embodiments, the signature identifier is a hash of the captured keys. In some embodiments, each cluster that is outputted corresponds to a unique combination of keys. In some embodiments, when determining which cluster to include a log in, the matching of keys is exact, where the key schemas for two logs are either exactly the same or are not.

In some embodiments, after grouping a set of search results according to key schema as described above, platform 102 provides output. For example, the platform may provide a user a view of log messages grouped based on keys (e.g., JSON keys). The number of messages in a group and a signature for the cluster may also be provided as output.

The user may then take various actions based on the clustering of structured log data by key schema. For example, the user may compare changes in cluster message count over time. As another example, the user may review messages for clusters that are newly identified before and after a timestamp. The user may also select one or more keys from a signature to extract into a field or to run subsequent searches. As yet another example, a user may mark, via a user interface, a cluster as an outlier/inlier, which may be fed into the LogExplain operator described herein.

LogReduce Values Operator

Suppose, for example, that now that an end user is able to see the different types of key schemas in the input set of log data, the end user is now interested in certain fields of interest. For example, a user may wish to further explore a key schema cluster that has a small number of logs. The user can view a subset of their data that is homogeneous with respect to a certain schema (all the logs in a cluster have the same JSON schema). The user may have become interested in that particular schema due to the low count or number of raw logs in that cluster that is presented via the UI. Now the user would like to view the associated values for that subset of logs in that cluster. In some embodiments, the user can use the LogReduce Values operator described herein to cluster those logs based on how similar they are with respect to the values (and not necessarily the keys that were in those positions in the key schema). In this way, when a user creates a query for certain logs in a batch of structured logs that have been ingested, platform 102 may provide the user a way to group the search results (e.g., JSON messages) based on key-values.

In one example embodiment, the LogReduce Values operator is implemented as a set of stages. For example, the operator receives structured log data. The structured log data may be received from other operators upstream in a stream pipeline. For example, output of the LogReduce Keys operator may be used as input to the LogReduce Values operator. After receiving structured log data, clustering is used to cluster elements passing through the operator. When a query finishes, clusters are returned as an aggregate object for visualizations of the clusters and the data in them (e.g., to show users the clusters). In some embodiments, cluster objects are made actionable/interactive. As one example, cluster objects are made clickable to allow further drill down in the cluster.

Suppose for example that the user would like to determine, within that key schema cluster, queries that take longer than a certain amount of time. For example, based on key schema, there may be a key for execution timing. Or as another example, the user may like to see information about logs in the key schema cluster for a certain value of a field such as customer-id.

Using the LogReduce Values operator described herein, the user may further cluster a set of input structured log data according to values. While in this example the LogReduce Values operator is used in conjunction with the LogReduce Keys operator described above, the LogReduce Values operator may be used independently as well.

In this example, suppose that the user is interested in the values for the keys/fields of customer ID (identifier) and caller module—that is, the user would like to determine any patterns in who the customer is making a call to and what their status is, and via the caller module, the mechanism by which the customer is calling/executing a search (e.g., via a scheduled search, API (Application Programming Interface), an email report, UI, dashboard rendering, etc.). The user may then investigate whether there is some pattern in the values of the logs. Here, the user may use the LogReduce Values operator described herein to cluster log data based on the values for certain keys of interest.

In some embodiments, the LogReduce Values operator represents each log/record (which is in structured key-value form), by some subset of the values that the user is interested in. A clustering algorithm is then applied to cluster those records together by their similarity with respect to the values.

After identifying the clusters, the clusters may be post-processed and transformed.

In this example, the user is clustering the records by the values for the fields/keys of Customer ID and Caller module. Suppose that based on the clustering, two clusters result. There is a large cluster of searches that are from a concierge (Caller module value) and they are from a particular customer (specific value of customer for Customer ID field). Then there is another set of searches that are from API (another value for Caller module) and they are from a different customer (with a different customer ID value). By using this LogReduce Values operator, the user may quickly identify interesting patterns that may indicate to them where to begin investigating the source/cause of an event. For example, suppose that most of the logs are coming from concierge queries launched by a customer with customer identifier "123". This is an interesting piece of information that the clustering-by-values of the platform has surfaced to the user from the pile of raw logs. Here, the user was able to have this information provided to them via inputting an operator into a UI to cluster log data by values on certain fields (which may be specified by the user when inputting the operator). The different clusters of values also provide a summary, where each cluster is a potential investigative path or reason for issues that are observed. The clusters that are formed may then be candidates for a deeper dive.

As another example, suppose that one of the clusters that is generated shows that logs in that cluster have a value of "unknown" for the Caller Module field. This may be problematic. The user can quickly see this via the UI via the cluster summary view, and then quickly access the subset of raw logs that have that pattern of values.

In some embodiments, the platform uses a similarity function to determine whether a log should be placed in a cluster (or should be used as a seed of its own cluster if it does not match to an existing cluster). A fuzzy algorithm may be used to account for values being similar, but not exact matches.

As one example of determining whether a log should be assigned to a cluster, a similarity function is used to determine how much the log resembles the logs already present in a cluster with respect to a set of fields of interest. If the log is similar (e.g., based on comparison to a similarity threshold) to those already in a cluster, then it may be added to a given cluster, even if it is not a perfect match on every key (but because, for example, it is a perfect match on enough keys). As one example, the similarity clustering is based on a distance function on the set of keys. If it is not similar enough (e.g., based on a comparison to a similarity threshold) to any of the logs in any of the clusters, then the log is placed off on its own cluster, where it becomes the seed for a new group of logs. In some embodiments, using a different set of keys could induce a dramatically different cluster.

In some embodiments, a signature is generated for each cluster. As one example, of generating a signature for a log (to identify a corresponding cluster in which to place the structured log), first, structured logs are grouped based on the unique keys they contain. Next, within each group of logs, clusters are created based on similarity of key-values. Multiple levels may be supported for nested structured logs. The signature is represented as a list of keys per hierarchy, where messages may be clustered by non-changing values.

In some embodiments, when entering the LogReduce Values operator, the user can also specify the keys of interest, the values of which are to be used to cluster an input set of logs. This level of user guidance can be used as the basis for partitioning of logs and may assist the platform in avoiding clustering logs by values for keys that are noise. The LogReduce Values operator may also be run without specifying keys of interest (and the operator will attempt to cluster according to all values for all keys, for example).

As shown in the above example, if a hybrid log (that has both structured and unstructured data) is being analyzed, then the structured payload of interest may be extracted from the log. The structured data may be grouped by key schema to obtain a summary of the representations of the log data by keys. The user identified a particular schema of interest via the summary view. The user then applied another operator on the subset of logs in that key schema cluster that are homogeneous with respect to the schema, in order to cluster that subset of logs by their actual values and contents. For example, the LogReduce Keys operator classified logs by key schema and provided a key schema-bucketed view of the logs. The LogReduce Values operator then clustered events together based on similarity with respect to values. The user may then look at further clusters of logs with similar values and manipulate that narrower subset of logs in a cluster. Thus, after several stages, the user has gone from a zoomed out, high level summary of logs to, with machine assistance by the structured log analysis platform, a zoomed in view of a specific subset of logs. This may be done with the user input of just the two operators described above.

In this example, the cluster that had queries with the value "unknown" for the caller module stood out to the user, and via a link provided by the platform, the user can view the logs in that cluster. Thus, as shown in this example, a user with minimal expertise may use these operators to easily and quickly identify needed information.

In the above example, the operators have been used to extract potentially strange behaviors of items that are entities that are occurring in the system. For example, the Customer IDs and Caller Module keys and their values are behaviors of specific backend components or actors or entities or systems. Via the operators provided to the user, the user can direct the structured log analysis platform to determine patterns of behaviors in those components without having knowledge of those components, and can determine any associations or relations between what they are doing and how they are doing.

While an example involving JSON structured data was described above for illustrative purposes, the structured log analysis techniques described herein may be variously adapted to accommodate any type of structured data as appropriate. For example, the platform can be adapted to analyze any structured data from unstructured data. Other examples of formats for structured data include CSV (comma separated values), other tabular formats (which may be parsed out for example, using regex (regular expressions)), XML, etc. In some embodiments, the output of the clustering/application of the operators is a data structure that has a tabular column-row, key-value structure. A single log may also include multiple types/formats of structured data. For example, a log may include both JSON fields and CSV formatted data (e.g., CSV in a JSON field). In some embodiments, the platform applies upstream parsers/transformations to arrive at a final representation that is a structured mapping of keys to values. For example, a JSON parse could be performed to determine that a JSON field is CSV. They are then sequenced and pipelined, and the JSON is parsed out. Additionally, the CSV data is parsed out from the JSON field and the union is taken of both of those as the final input into the downstream LogReduce Keys/Values operators.

Output may be provided by platform 102 based on the results of the clustering of structured log data by key-values as described above. For example, platform 102 may display to a user, via a user interface, log messages grouped based on key-values. The number of messages in the group and the signature for the cluster may also be presented as output.

In some embodiments, based on the results of the clustering by key-values, the user may perform various actions. As one example, the user may compare changes in cluster message count over time. The user may also review messages for clusters that are newly identified before and after a timestamp. The user may also select one or more keys from a signature to extract into a field or run subsequent searches. The user may also mark as a cluster an outlier/inlier to feed to the LogExplain operator described herein.

The structured log analysis techniques described herein may be beneficial in a variety of contexts, such as security-oriented use cases. For example, the general-purpose behavior analytics platform described herein may be used in the security domain for UEBA (user and entity behavior analytics). For example, in UEBA, users, devices, and servers may be identified as different entities. The behavior of these entities is modeled and monitored. The system may be monitored to watch for events such as certain types of communication, the time of day, the location of users, etc. Events that occur out of bounds may be flagged. One example of an event is when a user logs into a machine that they have never accessed before, or they are logging into a system at a time of day or from a geographic location in a way that they have previously not done.

In such a security domain, the structured log analytics platform may direct an end-user (analyzing logs that are collected about such events) to entities identified by such fields, and assist the end user in understanding how they are behaving or if any entities are behaving differently. For example, the end user may cluster logs according to fields/key schema, and then cluster some subset of the data to determine logs that have certain values for a set of fields (e.g., user name, log-in time, machine that the user logged into, etc.) that are of interest to further explore how clusters of users are behaving. From there, for a cluster of users, the system may then be used to detect if any of the users have changed their behavior from their historical behavior.

In addition to the security domain, the structured log analytics techniques described herein may also be applicable to the ops (operational) domain. For example, the structured log analytics platform may determine if a node or a container or a Kubernetes pod is behaving strangely based on its signatures and values that it is emitting. This provides a mechanism by which to detect anomalous behaviors that may be used to prevent events such as outages.

Using the techniques described herein, patterns of behavior may be found among fields and values. The behavior of those patterns over time may also be evaluated by comparing against historical data (e.g., for logs with certain keys/values, but in a different time range or window of time).

LogExplain Operator

Using the LogExplain Operator described herein, a user is able to determine if there is a reason that a value for a set of fields is observed and whether that reason has to do with certain exploratory keys. For example, once the user has a broad understanding of their logs (e.g., using the LogReduce Keys and/or LogReduce Values operators described above), they may like to dissect them further to understand causation for a security incident or outage.

In some embodiments, the LogExplain Operator is an operation that automatically finds explanations and visualizations that describe patterns on structured log data (e.g., JSON data). For instance, one use case of the LogExplain operator is to find explanations that can explain why one group of logs (also referred to herein as the test set) is different than its complement set (also referred to herein as the control set). In some embodiments, the test set contains logs that indicate abnormal or outlier system behaviors, w % bile the control set contains logs that inform the user of expected or baseline (inlier) behavior. In some embodiments, an explanation is defined as a set of key-value pairs common to the test set, but rare for the control set.

Continuing the above Ops (Operations) example use case, suppose that logs are being generated each time a search is executed. In order to improve search performance, the user is continuously looking to understand why searches were slow, why they failed, or other questions of this type.

The logs may have a large amount of information. For example, they may be large hybrid JSON entries, and even within the JSON payload, there may be a large number of different fields and parameters and measurements that encapsulate everything that the machinery tracked about the execution of a corresponding search.

Here, a user would often want to know what is special about the searches that failed. Here the user may use the LogExplain operator to determine explanations for why some searches failed, which may be indicated by a field in the logs (e.g., failed=1 would appear in the log if the corresponding search failed, or an error code=failed would appear, etc.). Here, in this example, the user is exploring explanations for the failing searches in terms of the keys/fields Caller Module and Customer ID. The use of the Caller Module and Customer ID fields are for illustrative purposes in this example, and other exploratory keys may be used. In some embodiments, the LogExplain operator is configured to determine sets of key-value assignments for those keys that are unusually represented in a set of interest (e.g., those logs for searches that failed) (where this set of interest is also referred to herein as a "test" set or "target" set), as compared to a "control set." In this case, the set of interest or test set includes the set of logs that meet the test condition, in this case, that failed==1. The control set includes those logs that do not meet the test condition (failed !=1 or do not have the failed error code).

The following are illustrative examples of the values for the Caller Module and Customer ID keys. For example, suppose Caller Module==Service. This indicates that the query was launched from a UI. Caller Module==Report indicates that the query was launched from a dashboard. Caller Module==Concierge indicates that the query was launched to generate an automated email of search results. With respect to Customer ID, different customers (having different identifiers) have different characteristics, data flows, and dependencies, and thus may be a category of interest. Customers may have different data access patterns, as well as data ingest rates. The customers may be segmented or isolated to different subsets of virtual machines or clusters to avoid, for example, the noisy neighbor problem. In cloud workloads, many workloads may be placed on a single machine: however, the expectation is that each customer will appear to have the independent experience of having their own machine. The noisy neighbor problem arises when this breaks down. For example, if one customer is mining cryptocurrency and dominating CPU (central processing unit) usage, this may potentially cause other customers to have a poor experience (e.g., suffer degraded performance) unless there are effective low-level safeguards to prevent it. Ultimately, it is the customers who are experiencing the search performance as either satisfactory or not. Thus, Customer ID may be an important key on which to explore explanations for search execution failures.

Using the LogExplain operator, the user may find explanations for search execution failures across these two exploratory keys/dimensions of Caller Module and Caller ID. As output, a list of explanations is provided (e.g., via a UI). In some embodiments, each explanation is a combination of values for the exploratory keys Caller Module and Customer ID, where that combination of values for the keys is presented as well.

For example, the list of explanations may be provided in the UI in a tabular format, where each row corresponds to a unique explanation (e.g., unique combination of the values for at least a subset of the exploratory keys Caller Module and Customer ID, also referred to herein as a unique combination of key-value assignments). In some embodiments, information about a candidate explanation is also computed and may also be displayed. This may include statistical information. One example of statistical information is test coverage, which indicates how frequently a given combination of key-value assignments appears in the test set (e.g., when the searches fail). Control coverage may also be determined and provided as output, which indicates how frequently the given combination of key-value assignments appears in the control set (the logs for searches that did not fail). In some embodiments, an explanation is also associated with a relevance score, where, in some embodiments, the relevance score is computed based on the ratio of the test coverage and the control coverage. Candidate explanations may be sorted on relevance score. For example, the relevance score may be computed as a percentage, with explanations sorted in descending order of relevance.

Based on viewing the outputted results, the user may determine that there is a large representation of a certain customer with Customer ID=123. For example, suppose that there were 41,209 searches, of which 66 failed. That is, there are 66 log messages in the test set, with the remainder being logs for non-failing searches that are placed in the control set. Suppose that for one row of the output that corresponds to the explanation Caller Module=Service and Customer ID=123, of the 66 failing searches, 8 of them had this combination of values for the exploratory keys, which is 12%, while only 0.61% of the non-failing searches (control set) had this combination of key-value assignments. This indicates to the user of an over representation of failing searches that involve Service-type Calls involving Customer 123. With this hypothesis surfaced to the user by the LogExplain operator, the user may now have more insights and a starting point into what to investigate (e.g., that there might be issues with Customer 123 and Service Caller Modules). Via a link provided by the platform, a user may then view the raw logs corresponding to that explanation.

Using the LogExplain operator functionality, the user can also easily investigate explanations for search failures using other exploratory keys, such as message time, client overhead, etc.

In some embodiments, frequent item set mining is used in facilitating the determining of whether a subset of key-values is overrepresented in the test set versus the control set. As one example, an apriori algorithm may be utilized. Other machine learning and data mining techniques for frequent item set mining may be used, as appropriate, to determine explanations.

The explanations may include values for subsets of the exploratory keys, where some of the explanations may overlap.

As another example, suppose a security type use case is where a user is evaluating their AWS (Amazon Web Services) audit log (where, for example, Cloudtrail is the end of such an audit log). The user is trying to determine if they can explain the presence of "access denied." For example, when hackers try to gain access, a common technique that they use is to try to "shake down" infrastructure rights. This may include the attacker attempting various methods, such as a password cracker, or a tool that attempts various kinds of passwords, usernames, etc.

One potential signal of such an attack would be the attacked system giving the hacker access denied-type errors. In this example, suppose that the user is trying to investigate who is causing the "access denied" in their infrastructure on what kinds of events, and who those users are. One hypothesis by the user may be that the fields with respect to which service is being called, which user is calling, and from which IP (Internet Protocol) address may be helpful to explain the occurrence of "access denied."

The LogExplain operator described herein may be used to explain the "access denied" errors based on this criterion (e.g., set of keys). Here, the user enters into the UI a request to apply the LogExplain operator on a set of input logs, where the user specifies, via the operator, that they would like to see possible explanations for the "access denied" error condition in the logs, where a candidate explanation is a certain pattern or set of values for a set of exploratory keys specified in the operator. For example, the condition of interest may be that the field error code=access denied. Exploratory keys may include event name, username, invoked by, and source IP.

In one embodiment, to determine explanations, the log analysis platform divides the input log data into two subsets according to the condition specified in the operator. Here, for example, the input log data is partitioned into logs that include the "access denied" error condition (the "test" set), and logs that do not include the "access denied" error condition (the "control" set). In some embodiments, for each pattern (e.g., unique combination) of values for the set of exploratory keys, the platform determines whether a given pattern of values for the set of exploratory keys is disproportionately present in the test set as compared to the control set (e.g., determine what values for the exploratory keys are more associated with the test set (error code=access denied) than the control set (without that error code)). As described above, in various embodiments, the LogExplain operator is implemented in part by using an apriori algorithm or any other appropriate technique for frequent item set mining and association rule learning. Other data mining or machine learning techniques may also be used.

As output, the LogExplain operator may provide a list of explanations for the conditions, where each condition corresponds to a unique combination of values for at least some of the keys in the exploratory set of keys inputted by the user when executing/invoking the LogExplain operator. For example, every one-key combination, every two-key combination, every three-key combination, etc. of the exploratory keys are computed as a hypothesis/explanation. In some embodiments, statistics or other information associated with each explanation pattern of values is also provided. As described above, this may include a coverage value, which indicates, for each of the test and control sets of logs, the proportion of log messages that have that pattern of values for the exploratory set of keys. For example, if 100% of the log messages that have "access denied" errors also have some combination of values for a particular explanation pattern, and 0% of the log messages that do not have "access denied" errors have that combination of values, then that pattern of values for the exploratory set of keys is a likely candidate for explaining "access denied" errors.

The following are additional security use case examples of using the LogExplain operator. The following are SecOps examples that pertain to either machines or users that are behaving in suspicious ways, where the goal is to identify which machine(s) or user(s) are behaving suspiciously based on a specific behavior (e.g., sharing data to outside servers). The following security use case examples are applicable to UEBA. For example, with respect to GuardDuty, a time range of GuardDuty may be used to identify test (outlier) versus control/baseline (inlier) sets in CloudTrail logs in order to test a customer system/infrastructure. The use of the LogExplain operator described herein is beneficial to a GuardDuty customer because it expands the criteria for GuardDuty, helping the customer reduce noise based on what they know regarding their architecture.

As a first example, suppose that an end user associated with the customer would like to detect if a user, Bob, is accessing AWS application programming interfaces (APIs) in an abnormal way. To do so, the following example steps may be performed:

1—tabulate cloudtrail logs pivoted on user=Bob as follows
    day |eventsource|eventname|geo:city|count|mu+3-sigma|delta=abs (count−(mu+3-sigma))
    mu+3-sigma=>get this from a lookup table or scheduled search for −30d
    2—INPUT: test_set=delta>0 in the above table
    3—OUTPUT: logexplain test_set on eventsource, eventname, city As a second example, suppose that an end user associated with the customer would like to detect abnormal accesses of AWS APIs by any users. To do so, the following example steps may be performed:

1—tabulate cloudtrail logs as follows
    day|user|eventsource|eventname|count |mu+3-sigma|delta=abs (count−(mu+3-sigma))

mu+3-sigma=>get this from a lookup table or scheduled search for −30d
2—INPUT: test_set=delta>0 in the above table
3—OUTPUT: logexplain test_set on eventsource, eventname, user The following is an example customer use case involving the use of the LogExplain operator. Suppose that for a given cluster of logs marked by the error headline "unexpected error" (where this is, for example, the output of the structured LogReduce keys and/or values operator described above), a user wishes to find an explanation for why this error headline is happening by examining the following fields:
1. server/url—>this matches the Customer tenant
2. client/appSessionID—>this matches a given conferencing session In some embodiments, LogExplain produces a result at a glance.

The following is an example of a search use case involving the LogExplain operator described herein to explain which customer, service module, or infrastructure is causing search slowness or failed interactive searches:
_view=failed_interactive_searches !"[stream_shadow"
|parse "explainJsonPlan.ETT *" as ettJson
|json field=ettJson "customerId", "callerModule", "tiers", "slowdownReason", "exitCode"
|logexplain exitCode=1 on customerId, callerModule, tiers, slowdownReason
DevOps use case 2: errors by host
_sourceCategory=stream
|if(_raw matches "error", 1, 0) as hasError
|count by hasError, _sourceHost
|logexplain hasError=1 on_sourceHost As described above, various combinations of numbers of exploratory keys are evaluated as potential explanations/hypotheses for explaining the condition of interest. In some embodiments, the list of explanations (combinations of values for the exploratory keys) is presented via a UI. The list of explanations may be ranked according to an overall score (e.g., relevance score, as described above). In some embodiments, filtering may be performed to combine explanations that might be redundant. For example, explanations that are redundant may be pooled into a larger group. In this way, a user has fewer explanations to have to review. Such filtering may be invoked via a flag entered along with the operator.

Thus, the LogExplain operator described herein provides a tool for performing a more explicit focused search for the set of key values that will be overrepresented in a set of logs that meet a test condition versus a control set of logs (that do not meet the test condition).

For example, after executing a search in response to a user created query to investigate a set of structured logs ingested by platform 102 (where the user may have previously grouped/clustered logs using the LogReduce Keys and/or Values operators described above), platform 102 may provide the user with a way to identify outliers versus inliers in the data. As one example, one cluster of messages (e.g., resulting from the use of the LogReduce Keys and/or Values operator) may be marked as outliers, while another cluster indicated as inliers. The indicating may be done via cluster identifiers. As another example, inliers versus outliers may be identified based on time series. As yet another example of identifying outliers versus inliers in the data, a user may specify a field in the structured log data (e.g., bytes_sent for VPC (Virtual Private Cloud) flow logs, a type of network traffic log used in cloud environments such as Amazon Web Services (AWS) or Google Cloud Platform (GCP)) with a statistical operator metric (e.g., mean+3*standard deviations or Median-Absolute-Deviation) to identify outliers. In some embodiments, after executing a search, platform 102 also optionally allows a user to specify dimensions for a base explanation. In some embodiments, platform 102 also provides the field and values that best separate outliers from inliers. In some embodiments, a user may base further searches on the explanation dimensions (e.g., explanatory keys described above). For example, if a specific Internet Protocol (IP) address is determined to be the cause/explanation for outliers in VPC flow logs bytes_sent, the user may search for messages referencing that IP address for further investigation.

As described above, the above structured log analysis techniques provide benefits over existing systems when analyzing structured data. For example, existing systems that are optimized for unstructured log data may attempt to group logs by text similarity, and then apply an alignment to try and identify which aspects of the log are changing, and then bucket the logs accordingly. Using such techniques for analysis of unstructured data and applying them to structured data can produce inaccurate and ineffective analysis results. For example, because an existing system is oblivious to the structure of the structure data, it will attempt to refine the structure itself, and will try to infer what are the keys and values. In effect, existing techniques treat an entire log as a string. Whereas, for example, the LogReduce Keys operator described herein, because it is aware of the key-value structure, it is able to group the logs by aligning the different events, joining them on the key-value structure, and then performing a clustering algorithm in that representation. Here, the data is treated differently as structured key-value data, and the structured log analysis platform determines similarity and patterns in that representation. It would be difficult to retrofit existing systems that are tuned for analyzing unstructured log data because they operate on a different set of assumptions and data representations (because they operate on the assumption that they are taking strings as input, not a data structure that includes key-value pairs). It would also be difficult to use an existing system tuned for unstructured logs to cluster structured logs by values (e.g., as is done by using the LogReduce Values operator described herein), because the existing unstructured log analysis systems are designed to infer structure from unformatted strings, while disregarding the values (which vary and are not considered part of the structure). The structured log analysis techniques described herein are optimized for structured data to find similarity between structured data representations, versus flat strings, which are different algorithmic problems. Here, the structured log analysis techniques provide mechanisms for structure-aware event clustering and common-value motif mining.

While string similarity log analysis systems may be useful when information about the data is unknown (e.g., because it is unformatted), it may not be suited for structured log data, as described above. Further, existing string-based systems attempt to derive some type of structure from unstructured data, and may generate templates, by which logs are grouped. Grouping logs by templates of derived structure is a different type of grouping from grouping logs by values as described herein.

Here, the structured log analysis techniques described herein have a different data structure representation/data types as compared to existing log analysis techniques for unstructured data. For example, traditional systems for analyzing unstructured log data accept strings, while the structured log analysis techniques described herein accept maps from string to string, and may have a richer data structure. In some embodiments, the map is generated as the output of a parser (e.g., JSON parser, CSV parser, etc.).

Further Example Details and Embodiments Regarding LogReduce Keys

As described above, the LogReduce Keys operator allows users to explore and group structured logs by their schema. In some embodiments, the input to the LogReduce Keys operator is structured logs in the form of raw, unparsed logs. Each of the logs may have a separate schema, which may be common across some of the logs, and different across the rest. The LogReduce Keys operator described herein allows a user to select logs with a certain schema and explore the selected logs further.

In one embodiment, executing the LogReduce Keys operator includes performing lexicographical sorting of input schema/column names parsed out from structured logs (e.g., using parsing engine 116 of platform 102). The lexicographically sorted input schema/column names are then hashed to produce a value corresponding to that order of schema names. In this way, the same schema will have the same hash value. In some embodiments, the LogReduce Keys operator then outputs the same logs in an unparsed format, but with a new column containing the hash value. In some embodiments, the user is able to select those logs downstream using the value in this column.

The LogReduce Keys operator may be executed in a standalone manner. The output of the LogReduce Keys operator may also be consumed by further downstream operators (LogReduce Values and/or LogExplain operators). If there is no further downstream operator (e.g., the LogReduce Keys operators is the last in a pipeline of operators being executed), in some embodiments, the operator produces aggregate results by performing a count by operation on an identifier of a schema and/or the keys in the schema. Additional post-processing steps may also be performed to reorder the schema keys by frequency across rows, and lexicographically across columns as well, to generate quicklinks for further drilldown.

If there is a further downstream operator, then in some embodiments, the results of executing the LogReduce Keys operator are not aggregated. In some embodiments, quicklinks, which will link to a new query with a "where" filter (that, for example, filters on schema identifier), is one example subset of this condition.

The following is example query syntax:
1. Example Base case: Downstream of JSON Parsing
_sourceCategory=aws/cloudtrail
|logreduce keys
Or if there is a need, the following may be expressed,
|json auto [parser]json auto maxdepth=2
Allow downstream operations on results
_sourceCategory=aws/cloudtrail
|logreduce keys
|count by_some_field
_sourceCategory=aws/cloudtrail
|logreduce keys noaggregate
|logexplain_signature_id="ABC" against_signature_id="123" on a, b, c In some embodiments, the LogReduce Keys Operator is implemented as an operator pipeline (in which multiple operators are executed). As one example, there are two pipelines to implement the functionality of the LogReduce Keys Operator.

As one example input to the operator, the input is from a parsing operator. In some embodiments, upon receiving a "PLUS" element, the operator pipeline performs lexicographic sorting of all non-Null keys and generates a hash using a hashing function.

The following is an example visualization of an output schema of the LogReduce Keys Operator. Two example ways of showing the output schema are provided below:
The first is to add additional columns to the existing log output with the hash value, as shown in the below example output schema.

| Example Output Schema | | | |
|---|---|---|---|
| Time | Message | Schema String | Schema Hash |

In some embodiments, parsed fields are also available (e.g., with an additional field containing the hashed code for a particular schema).

In some embodiments, a human readable comma separated list of fields is added as the schema string. The schema hash provides a way for users to be able to perform further operations for a subset of logs uniquely identified by the schema hash.

Another example option is to show the hash for the schema along with a count of the logs that match a hash in the Aggregates tab.

In the first case, it might warrant the user to look through all pages of results to find all the possible schema hashes. Although, in some embodiments, the user can run a count on the results themselves to obtain the second format.

Figure 2:
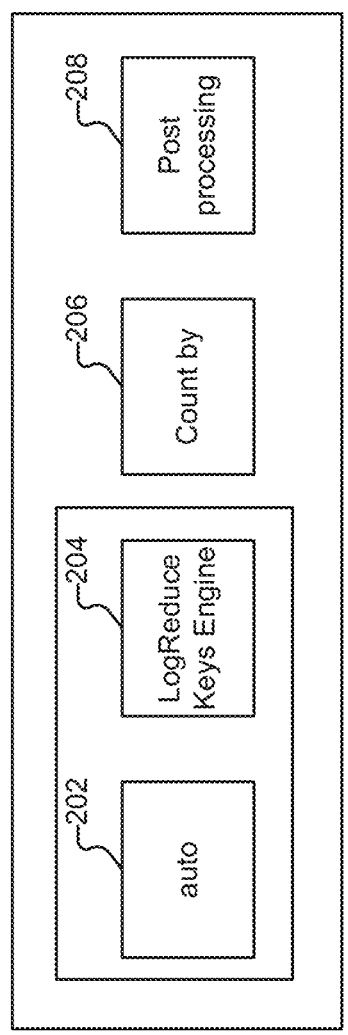
FIG. 2 illustrates an embodiment of an operator pipeline for clustering by key schema.

FIG. 2 illustrates an embodiment of an operator pipeline for clustering by key schema. In some embodiments, the operator pipeline shown in FIG. 2 is implemented by structured log analysis engine 118 of platform 102. In this example, the operator pipeline of FIG. 2 is configured to produce an aggregate result with counts of each schema and a drilldown presented in the form of a quicklink. In this example, auto engine 202 is configured to automatically detect objects in logs of a certain format (e.g., automatically detect JSON objects in logs, where such an automatic JSON parser is also referred to in various examples herein as "JSON-Auto") and extract the key/value pairs. This may be performed without the need to specify fields in a parse statement LogReduce Keys engine 204 is configured to determine key-schema of the logs. In some embodiments, LogReduce Keys engine 204 further includes a pipeline for performing mapping, which may include mapping the log to a key-schema signature/cluster. In some embodiments, the mapping pipeline is configured to produce non-aggregate results, and tags each raw message to a schema type and/or a schema list. This provides flexibility to a user to use the operator for their own downstream use cases, as well as to enable quicklinks for drilling down further to filter down the logs (e.g., using post processing engine 208, described in further detail below).

Count by engine 206 is configured to count logs. This includes a "reduction" phase (corresponding to the mapping phase described above) in which a count is maintained of how often a key-schema is seen (e.g., number of logs mapped to that key-schema). In some embodiments, the count by engine is implemented via Scala classes.

Post processing engine 208 is an operator that is configured to operate on the aggregate results generated by the count-by operation performed by count-by engine 206. In some embodiments, the post processing operator performs two operations: (1) sorting of schema keys for easy readability, and (2) generation of quicklinks for drilldown. The following is one example of sorting schema keys. In some embodiments, the schema keys are sorted for each row based on the overall frequency of each key and across rows lexicographically. This allows a tree-like view which makes reading this information easier. In some embodiments, ellipses are added in an aggregate user interface (UI) for this.

The following is one example implementation of generating quicklinks. In some embodiments, the quicklinks are generated using the original search string—where the query prior to the LogReduce Keys clause is maintained and appended with a specific "noaggregate" query (e.g., to return raw logs, as described above) followed by a where filter on the schema hash. In some embodiments, the quicklink opens a new search tab maintaining the search parameters such as time range, parsing information, timestamp (message/receipt time), etc.

In one example implementation, a new query is formatted using uniform resource locator (URL) formatting, such as shown below:

/ui/#/search/@${timeRange.getStartTime}, ${timeRange.getEndTime)}@${encodedQuery}

However, it may be difficult to preserve all the search parameters efficiently, as well as to maintain the changes if there are changes to the query creation parameter.

One example alternative to create these search queries is to use a service for generating shortcodes, which in some embodiments takes a search instance and customer information to generate a shortcode which uniquely identifies the quicklink. In some embodiments, a shortcode is generated for every schema.

Example Trade-Offs and Edge Case Handling

The below section discusses possible edge cases that may arise from implementation, and steps to address them. JSON structured data is described in the below example for illustrative purposes. In various embodiments, the techniques described herein may be variously adapted to accommodate any type of structured data, as appropriate.

Upstream Fields/Fields Mentioned in Query

In some embodiments, data in the search pipeline is stored in a data structure that has two parts—a specific schema portion which is inferred from the search query and may be an array of fixed length, and a dynamic part with data that is extracted as a part of an operator (which cannot be anticipated at query time until the data is seen and processed). Some example implementations consider an "addFields" in a tuple that is received from upstream operators. The "addFields" refers to the aforementioned dynamic portion of a stream tuple element, and in some embodiments may be implemented as Map[fieldname, datatype]. In some embodiments, the LogReduce keys operator utilizes this dynamic addFields portion of the data structure, since, in some embodiments, a parser extracts the field (e.g., from JSON) dynamically/on the fly and stores them in this element of a tuple. In some embodiments, this does not include any built-in fields or fields that were added to the schema as a result of the query. This may arise in two cases:

Fields are received that are a consequence of upstream operations like a parse or a split operation. This brings up the question of whether these fields are intended to be considered in the schema or would the user only expect it to be working on the JSON/key-value part of their logs In some embodiments, the user is not permitted to write a query with either the fields/keys parameter, _sourceCategory=aws/cloudtrail
|json auto "<fieldName>"
|logreduce keys Writing the query in the above way may not align with the intention of the operator to begin with, but in some embodiments, mentioning such a field may drop it from being considered in the schema hash.

One example way to solve this is to change the query as,
_sourceCategory=aws/cloudtrail
|logreduce keys parser=json In this case, the possibility is taken away of the user making mistakes in the automatic parser (e.g., automatic JSON parsing by auto engine 202) and creating the operator pipeline in the backend with the auto engine followed by LogReduce Keys.

Or, as another example, a global analysis of the query may be performed to see what fields were mentioned in the auto engine (e.g., "JSON-auto") and consider those values from an "inputSchema." As described above with respect to the "addedFields," in some embodiments, the static part of the stream tuple described above is an array of fixed length. This may be inferred when the engine is built based on the fields that are expected in the output as seen from a query. This schema may be updated by some operators, and may be fed from one operator to another in a search pipeline. In some embodiments, the upstream schema an operator receives from the operator prior is referred to as the "inputSchema."

Another example way to solve both the points above is to consider both the inputSchema fields as well as the fields in addedFields for hashing. In some embodiments, facilitating this includes filtering built-in schema fields, Field Extraction Rules (FERs), and FSRs (Field Storage Rules). In some embodiments, field extraction rules are parsers that a user can define at runtime or ingest time on their own logs. The former may be much easier than the others.

There may be fields injected due to Field Extraction Rules that come into the operator. This may be a trickier case because the user may not be aware of all the FERs available on their environment and this could affect the results they see in a way they do not understand. In some embodiments, FER fields are filtered out and the algorithms are run on the others.

Example of how user experience may be affected:

The FER could be generated from meta-data and the user can receive different schema hashes for identical logs which differ in meta-data information.

The FER could be extracted from part of the log that was not JSON and not of relevance to them, but the schema hashes could differ because of the FER.

The FER could have a conflict with a JSON-auto field which can only be resolved by calling out the field in the JSON-auto query—this would cause issues mentioned above.

In the FER case, it is also to be considered what significance FERs usually have to a user. In some embodiments, in order to filter FERs, a view for the schema may be requested which provides only built-in fields and FERs and filters them out.

User Parsing Out JSON into a Field

There could be a use case where the user parses out JSON from the log upstream and would want to run LogReduce Keys on the extracted JSON.

For example,
((_sourceCategory=stream "explainJsonPlan.ETT"))
|parse "explainJsonPlan.ETT *" as parsed_ett
|logreduce keys field=parsed_ett In one embodiment, the implementation uses JSON auto to detect JSON blobs in the log and if the user has logs that follow the recommended format, this would work for it.

The ability for the user to parse and specify the parsed field as a target may be extended using a "fields" option of an automatic parser accordingly. For example, in a hybrid log case, the "fields" options allows a user to specify which "top level/outer" field to apply the automatic parser to (e.g., which field contains the further nested payload JSON).

Figure 3:
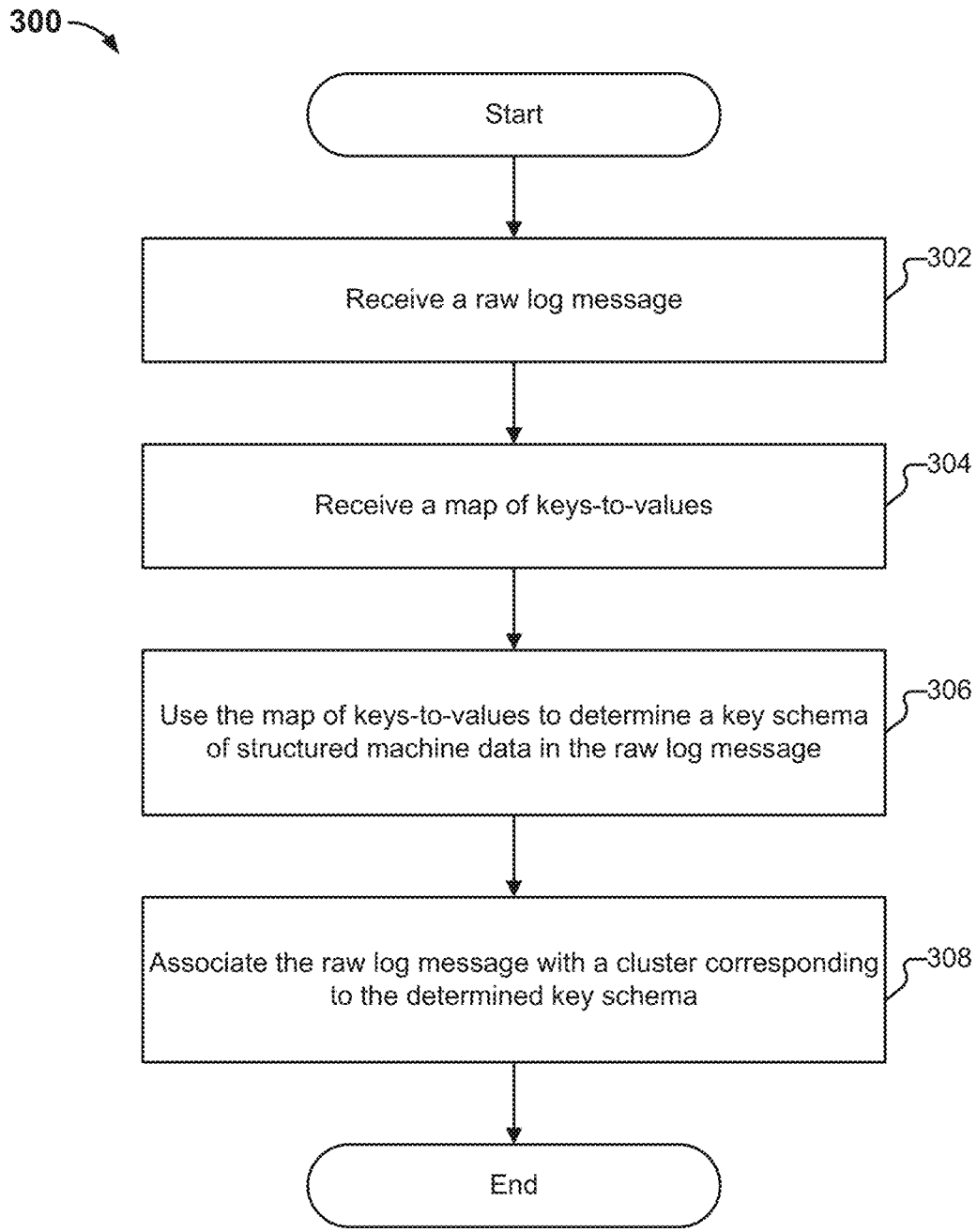
FIG. 3 is a flow diagram illustrating an embodiment of a process for clustering structured log data by key schema.

FIG. 3 is a flow diagram illustrating an embodiment of a process for clustering structured log data by key schema. In some embodiments, process 300 is executed by platform 102 of FIG. 1. In some embodiments, process 300 is executed in response to a user invoking the LogReduce Keys operator described herein. The process begins at 302 when a raw log message is received. At least a portion of the raw log message includes structured machine data that includes a set of key-value pairs. At 304, a map of keys-to-values is received. In some embodiments, the map of keys-to-values is generated using a parser. At 306, the received map of keys-to-values is used to determine a key schema of the structured machine data. This may include dropping or discarding the values from the map of keys-to-values generated by the parser. The key schema is associated with a corresponding cluster. At 308, the raw log message is associated with the cluster corresponding to the determined key schema.

The following are examples illustrating various portions of process 300. Examples involving JSON and KV format cases are described below for illustrative purposes. In some embodiments, unless separate JSON and KV cases are specifically mentioned, the below applies to both formats.

Figure 4A:
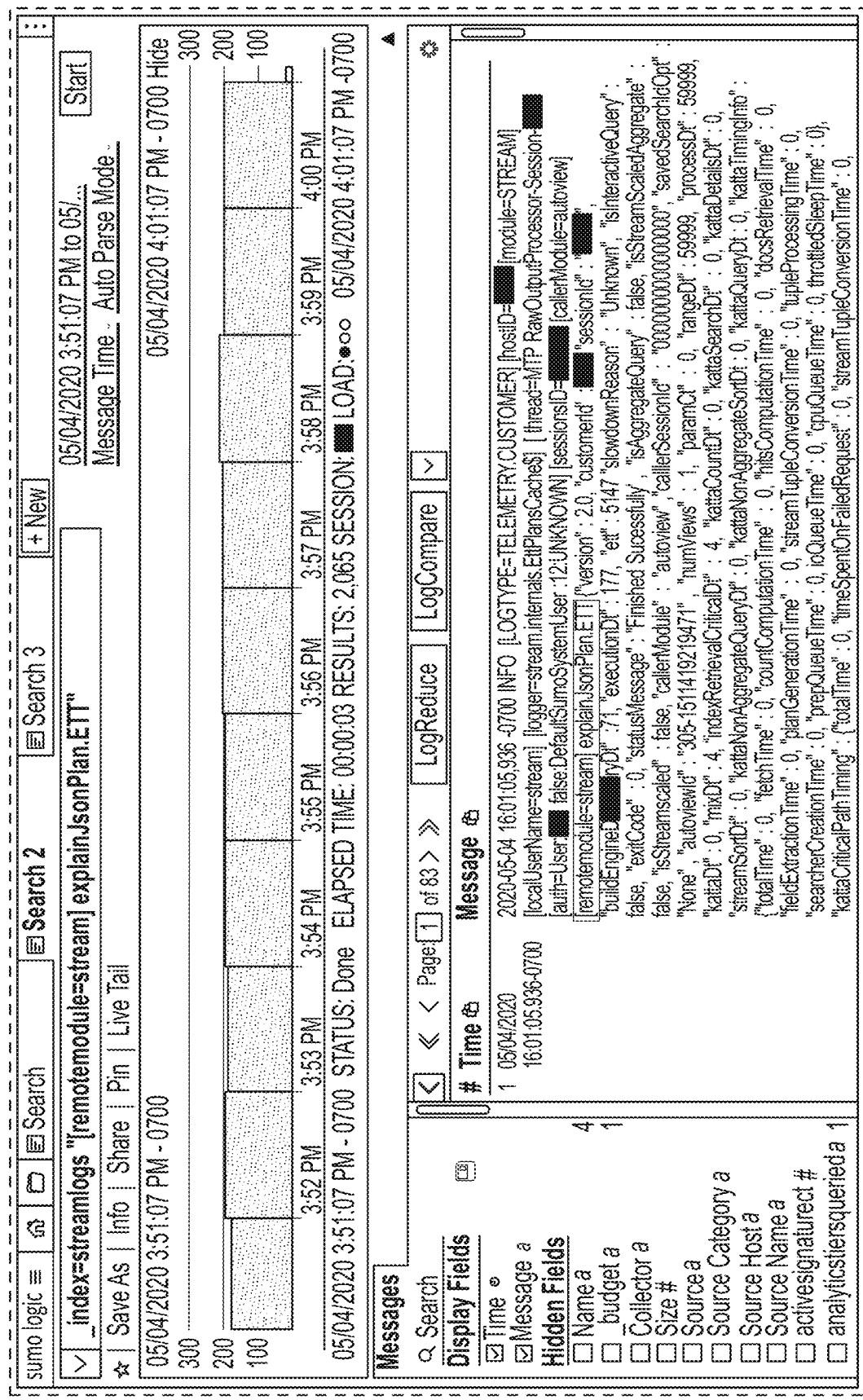
Figure 4B:
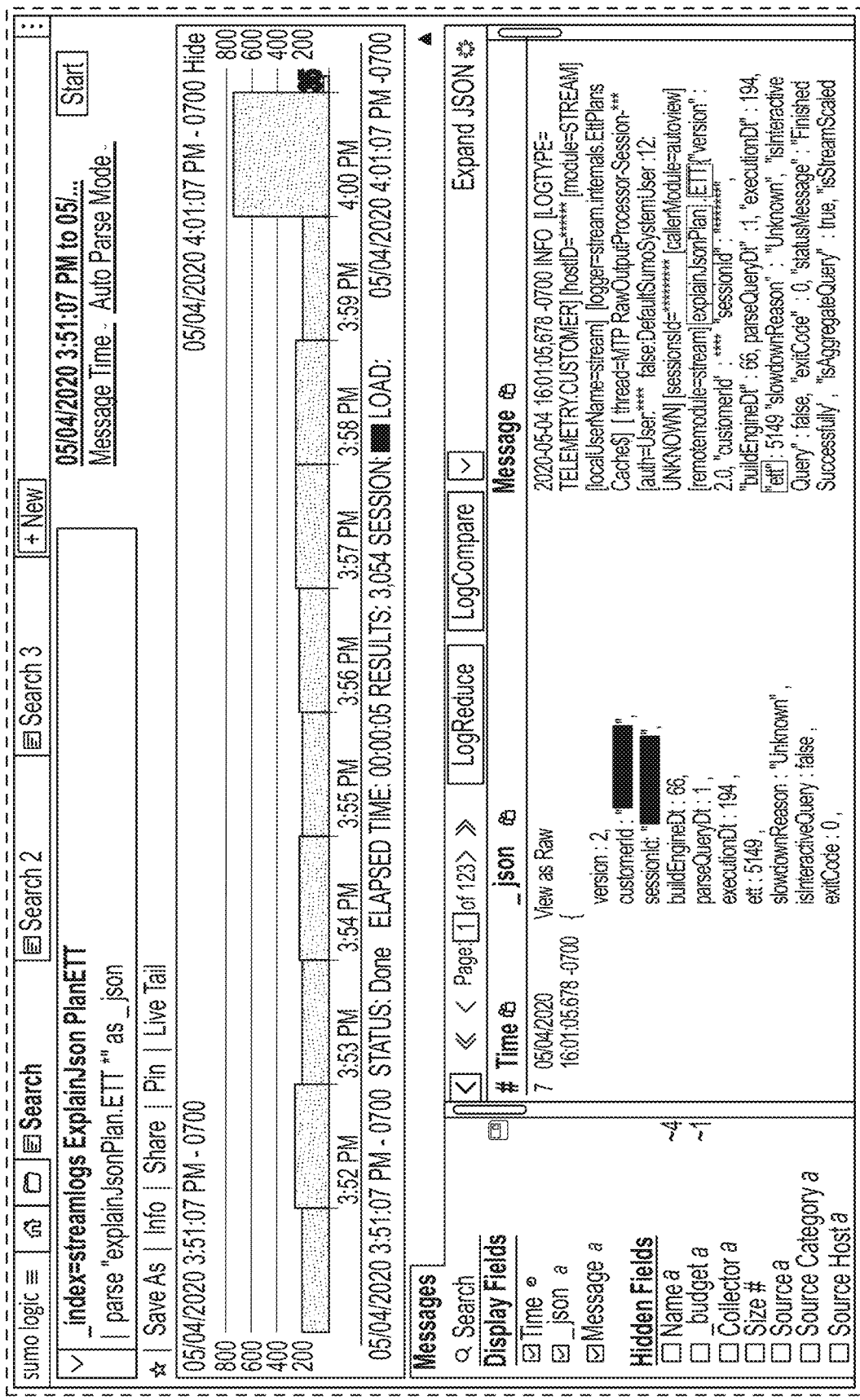
Figure 4C:
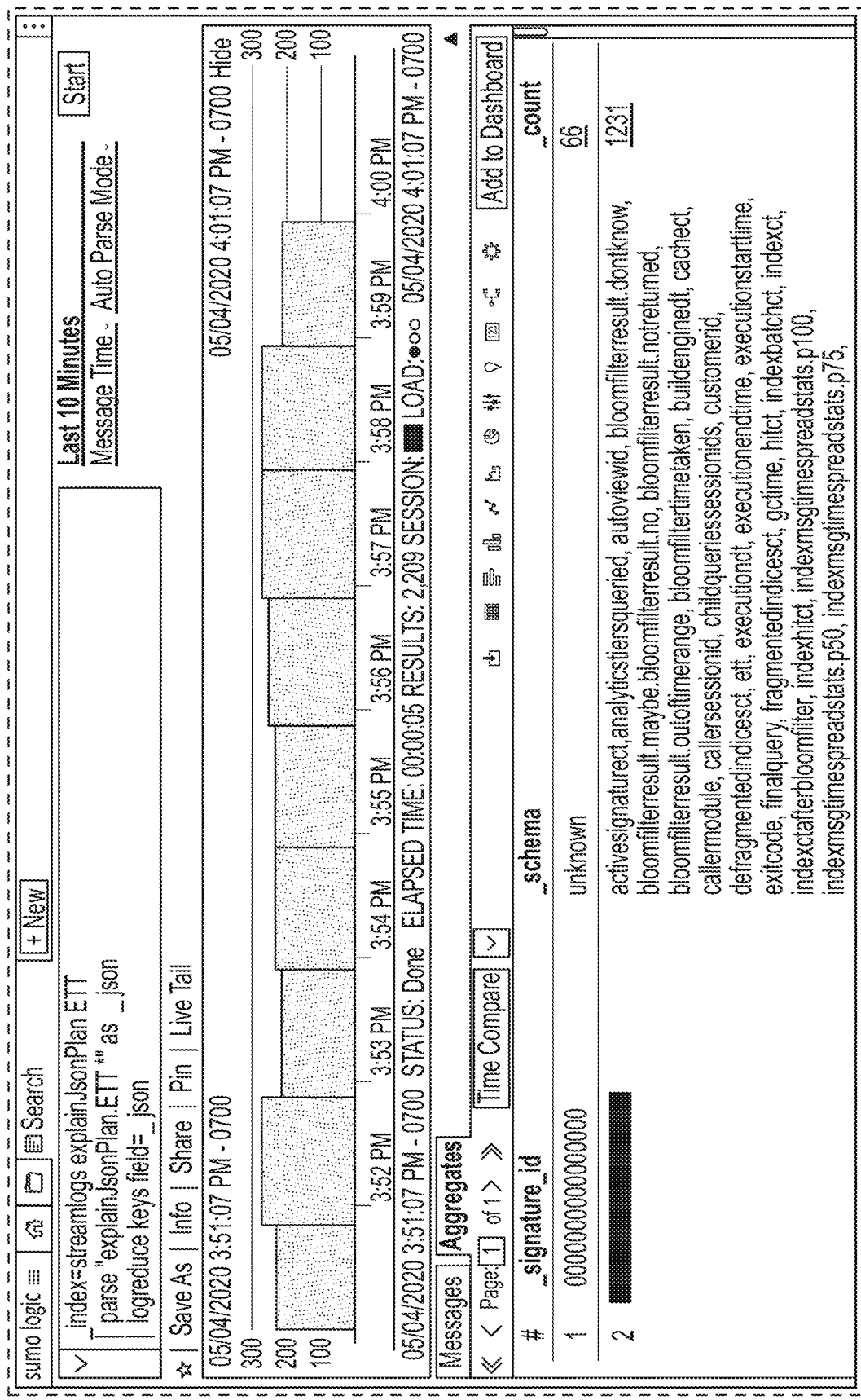
Figure 4D:
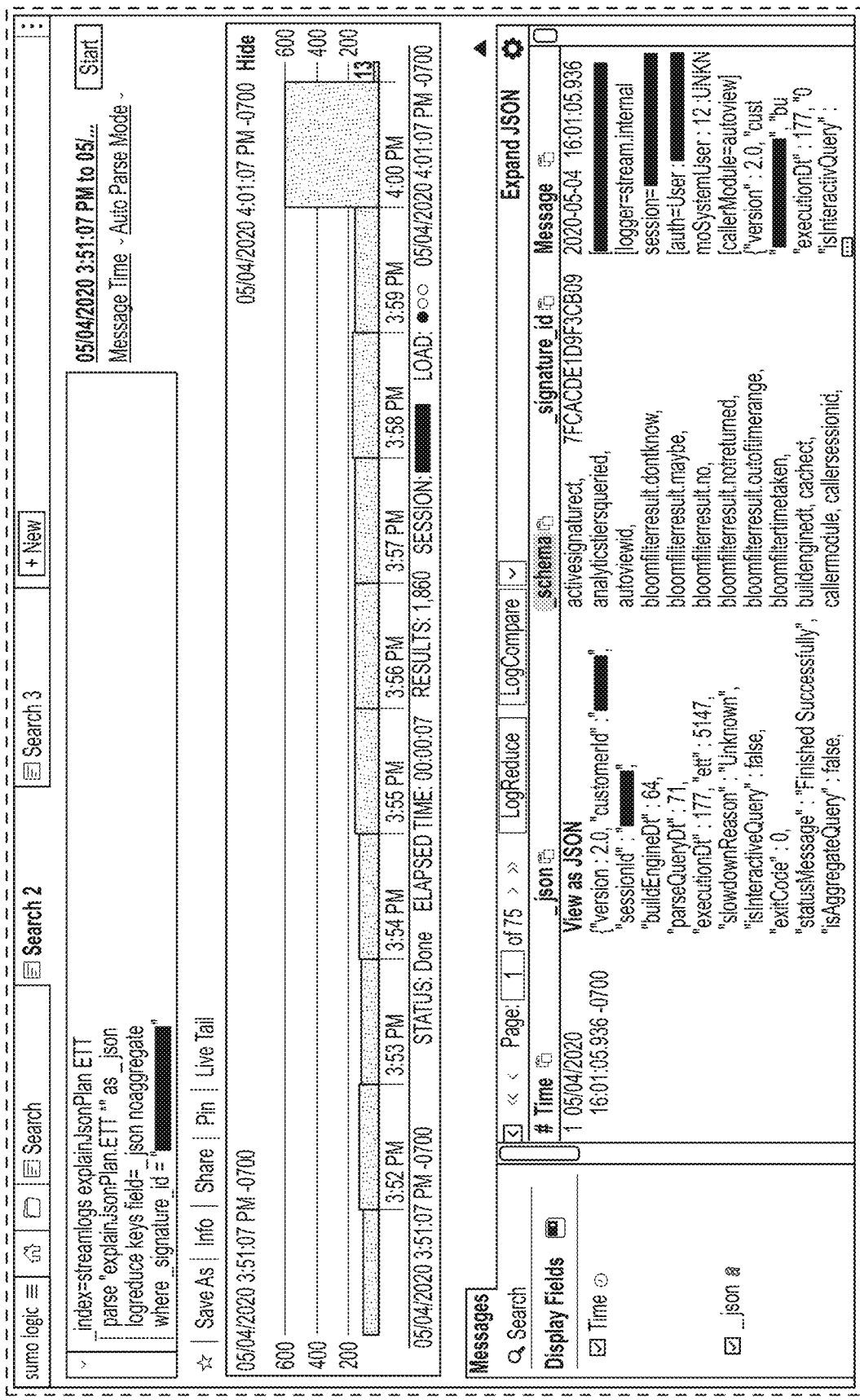

FIG. 4C illustrates an embodiment of JSON structured log data.

Figure 5A:
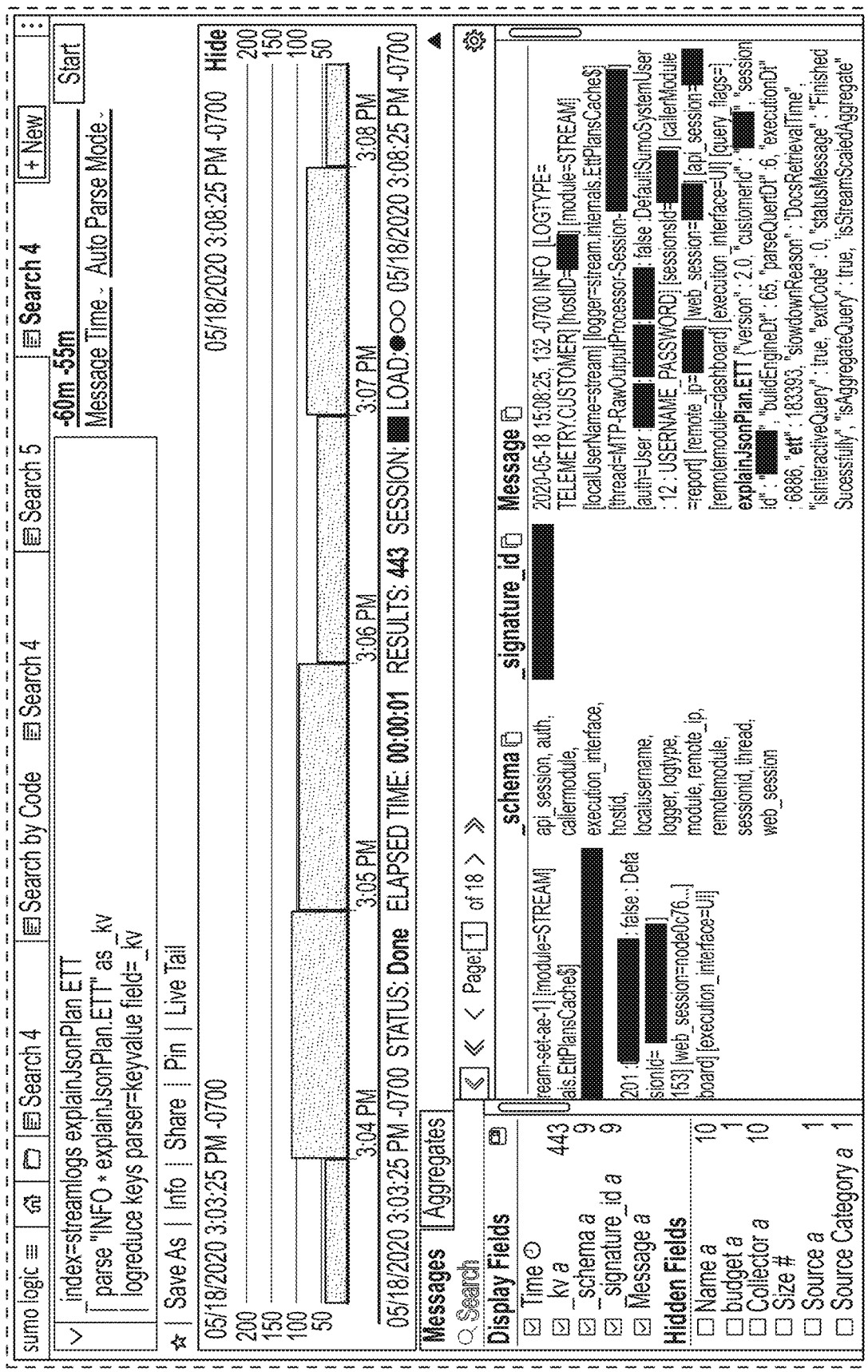
FIGS. 5A-5C illustrate embodiments of KV structured log data.
Figure 5B:
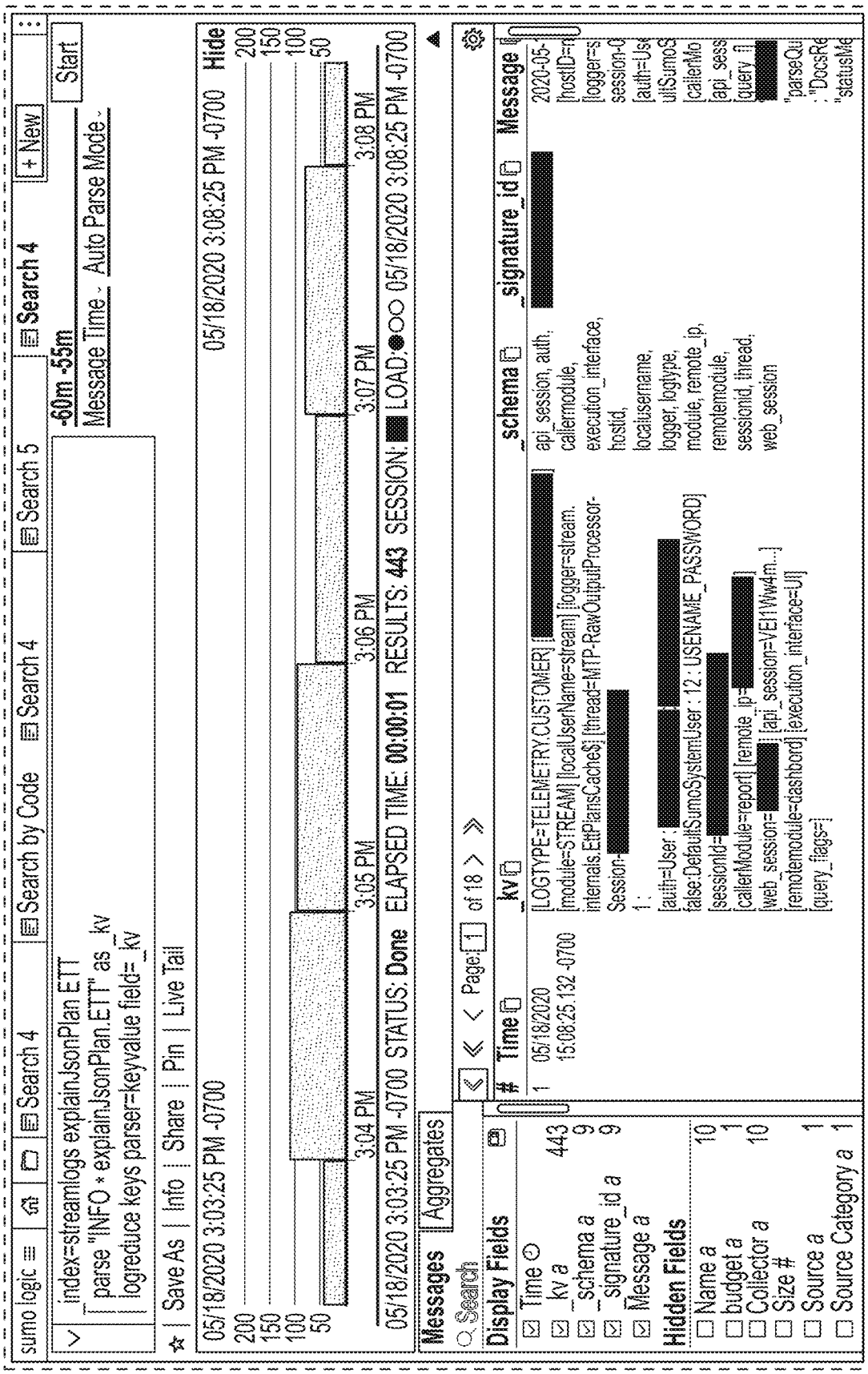
Figure 5C:
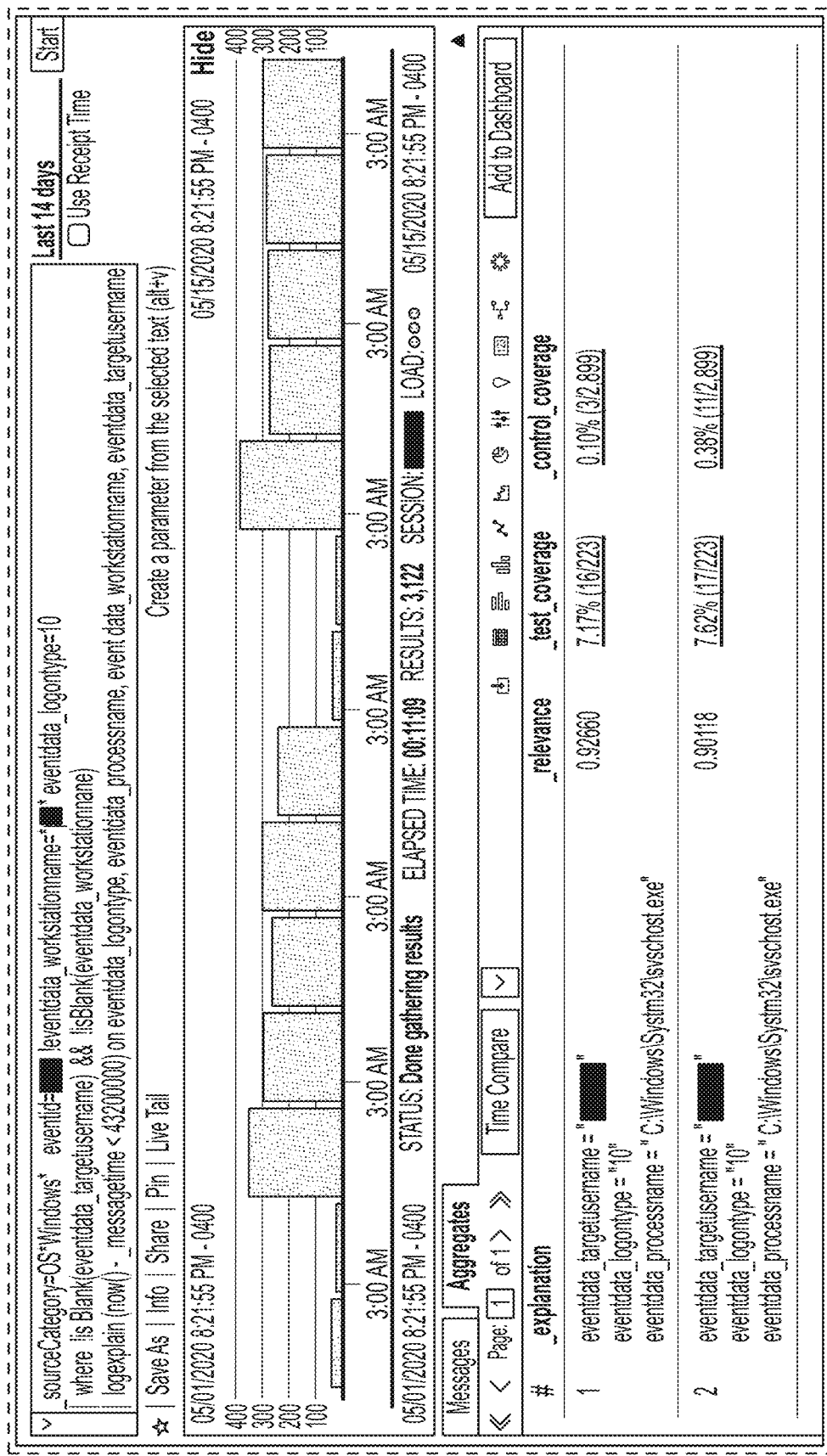

FIGS. 5A-5C illustrate embodiments of KV structured log data.

The following are examples of parsers for extracting structured data from a log message (e.g., from structured and semi-structured raw log messages).

KV
    _index=streamlogs explainJsonPlan ETT
    |parse "INFO*explainJsonPlan.ETT" as_kv
    |logreduce keys parser=keyvalue field=_kv JSON
    _index=streamlogs explainJsonPlan ETT
    parse "explainJsonPlan.ETT *" as json
    logreduce keys field=_json The following is an example of a user input using the LogReduce Keys operator described herein:
    2020-05-18 15:00:00,784-0700 INFO [LOGTYPE=TELEMETRY.CUSTOMER] [hostId=***12345ABC][module=STREAM] [localUserName=stream] [logger=stream.internals.EttPlansCache$] [thread=MTP-RawOutputProcessor-Session-0.123456789-ABCDEFG-1][auth=User: user@demo.com:00000012345:01234XYZ:false:DefaultSumoSyste mUser:12: USERNAME_PASSWORD] [sessionId=S12345ABCD][callerModule=service] [remote_ip=12.34.56.781][web_session=node123] [api_session=XYZ123] [remotemodule=stream] [execution_interface=UI][query_flags=] explainJsonPlan.ETT {"version": 2.0, "customerId": "01234XYZ", "sessionId": "F12345ABCD", "buildEngineDt": 278, "parseQueryDt": 12, "executionDt": 50 . . . .

The following are examples of maps usable to extract key schema of structured log data in a raw log message.

JSON
    . . . explainJsonPlan.ETT {"version": 2.0, "customerId": "01234XYZ", "sessionId": "S12345ABCD", "buildEngineDt": 278, "parseQueryDt": 12, "executionDt": 50 . . . .

KV
    . . . INFO [LOGTYPE=TELEMETRY.CUSTOMER] [hostId=***12345ABC] [module=STREAM] [localUserName=stream] [logger=stream.internals.EttPlansCache$] [thread=MTP-RawOutputProcessor-Session-0.123456789-ABCDEFG-1] [auth=User: userr:demo.com: X012345:01234XYZ:false:DefaultSumoSystemUser:12:U SERNAME_PASSWORD] [sessionId=S12345ABCD] [callerModule=service][remote_ip=12.34.56.781][web_session=node123] [api_session=XYZ1231][remotemodule=stream] [execution_interface=UI] [query_flags=]explainJsonPlan.ETT . . . .

The following are examples of how the maps are applied to the structured log data to determine the key schema of the structured log data. As described above, the key schema may be extracted or otherwise determined by discarding the values from the map of keys-to-values generated by a parser.

JSON
    {
    version:2.
    customerId:"01234XYZ",
    sessionId:"S12345ABCD",
    buildEngineDt:278,
    parseQuervDt:12,
    executionDt:502,
    ett:5949,
    slowdownReason:"UnKnown",
    isInteractiveQuery:true,
    exitCode:0,
    statusMessage:"Finished successfully", . . .
Becomes the below extracted key schema
    Version, customerId, sessionId, buildEngineDt, parseQueryDT, executionDt, Ett, slowdownReason, isInteractiveQuery, exitCode, statusMessage KV
    [LOGTYPE=TELEMETRY.CUSTOMER] [hostId=***12345ABD] [module=STREAM] [localUserName=stream] [logger=stream.internals.EttPlansCache$] [thread=MTP-RawOutputProcessor-Session-9.876543210-1][auth=User: user2@gdemo.com:0000)045678:01234XYZ :false: DefaultSumoSystemUser:12:USERNAME_PASSWORD] [sessionId=S45678EFGH] [callerModule=report] [remote_ip=98.76.54.321][web_session=node456] [api_session=ASXYZ123] [remotemodule=dashboard] [execution_interface=UI] [query_flags=]
Becomes the below extracted key-schema
    api_session, auth, callermodule, execution_interface, hostid, localusername, logger, logtype, module, remote_ip, remotemodule, sessionId, thread, web_session The following are examples of key schema (e.g., combinations of keys extracted from the structured log data), as well as data structure representations.

FIG. 6A illustrates an embodiment of a JSON key schema.

FIG. 6B illustrates an embodiment of a KV key schema. In some embodiments, the keys are represented as a Set [String] (e.g., a Set of Strings, in Scala).

One example implementation of determining a key schema is to run a parser and discard the values. A modified parser may also be used that ignores the values as it parses.

One example of how to determine, based on the extracted key schema, which cluster (e.g., in a set of clusters) to associate a raw log message with is as follows. For each message, the Set[String] is extracted, and then the message is grouped by equality of this data structure.

The following is one example of how a raw log message is included or otherwise associated with a particular cluster. In one embodiment, each log is augmented with this schema data structure (Set[String]), and then an SQL-style GROUPBY—COUNT operation is applied in a query language (e.g., the Sumo Query Language), resulting in a tabular output mapping each schema (Set[String]) to its associated count of raw logs. In some embodiments, this data is internally represented as a Map[Set[String], Int] (map/dictionary/table) from schema to count.

TABLE 1

Table 1 below illustrates examples of identifiers of clusters:

| a | 12345ABCDE | auth, hostid, localusername, logger, logtype, module, remotemodule, sessionid, thread, callermodule | 98 |
| --- | --- | --- | --- |
| 2 | XYZ123ABC | auth, hostid, localusername, logger, logtype, module, remotemodule, sessionid, thread, callermodule, customer | 2 |
| 3 | DEFGHI987 | auth, hostid, localusername, logger, logtype, module, remotemodule, sessionid, thread, callermodule, execution_interface, remote_ip | 100 |

The following are examples of information that may be provided as output (e.g., via a UI).

FIG. 7 illustrates an embodiment of a user interface. The example output of FIG. 7 includes schema (e.g., what keys) along with the count (e.g., how many logs). In this example, the count itself is also a hyperlink that can be clicked to retrieve the actual raw logs associated with that schema for either direct inspection or further query processing (potentially including additional parsing and aggregation).

The following is an example embodiment of how to highlight (e.g., in a UI) the differences between key schema clusters.

In one embodiment, in order to maximize the usefulness to the user for quick/easy visual inspection, the schema Set[String] results are presented as follows.

First, the keys are sorted according to global frequency (e.g., in how many logs does a given key appear?)—i.e., pulling the most important/common keys "forward" to the beginning of the list. Note that in some embodiments these global frequencies can be reconstructed from the Map[Map[String,String], Int] schema count data structures by summing the counts of all Map[String,String] schema in which a given key appears.

Second, the schemas themselves are sorted lexicographically by the sequence of key strings. The motivation of this step is to "align" matching/similar keys across schema, in order to maximize the obviousness of differences/discrepancies between adjacent schema rows in the final results.

The following is an alternative embodiment of presenting cluster differentiation using an additional clustering algorithm. In this example, clusters are presented as "diff-style" versus some central "reference schema." That is, for example:

1. Define a pairwise distance function between schema sets (e.g., some edit distance—such as the minimum number of entries that should be added/removed in order to convert one into the other)
2. Find the "centroid" of all schemas (e.g., which has a minimum average distance to all other schemas)—define it as the reference schema
3. Present the reference schema as the 1st results, and represent all other schemas in terms of their diff versus the reference Further Example Details and Embodiments Regarding LogReduce Values As described above, in some embodiments, the LogReduce Values operator operates on structured log data to cluster the structured log data by key-values. In some embodiments, executing the operator includes running a categorical clustering algorithm and output cluster centers. In some embodiments, these cluster centers are made clickable, and the ability to drill-down into these cluster centers may be provided by another operator that allows results to be consumed by downstream operators such as the LogExplain operator.

In one embodiment, the LogReduce Values operator is implemented as the following example stages:

1. The LogReduce Values operator receives structured data from operators upstream in a stream pipeline.
2. Clustering: Using stream clustering to cluster the stream elements passing through the operator.
3. When the query finishes, the clusters are returned as an aggregate object for visualizations of the clusters and the data in them.
4. The cluster objects are made clickable (e.g., by using an additional operator) to further drill down in the cluster.

Input Format

The following are two example input formats for the LogReduce Values operator:

1. Raw objects (e.g., raw JSON objects) that are typed as strings that are valid structured data.
2. Pre-parsed tabular data where, for example, the key is the column name and the value is the row entry for that column.

There may be various tradeoffs for the different types of input formats. For example, input format 1 above may benefit the user by allowing the user to feed in logs with little or minimal preprocessing and parsing. As a consequence of accepting raw strings (e.g., raw JSON strings), in some embodiments, the operator should internally manage the parsing step, which may limit the flexibility of users who want to define their own parsing beforehand. On the other hand, example input format 2 may allow more flexibility than example input format 1, but it may not prevent users from feeding the operator meaningless inputs such as raw JSON or nested JSON objects as entries in a column, which may put the responsibility on the user to correctly obtain what they send to the operator. Although example input format 1 allows the user to provide no initial preprocessing, most use cases may involve users parsing, filtering, and transforming fields before feeding the input to the structured log clustering operator. In some embodiments, a table-in format is forced to the operator.

Figure 8:
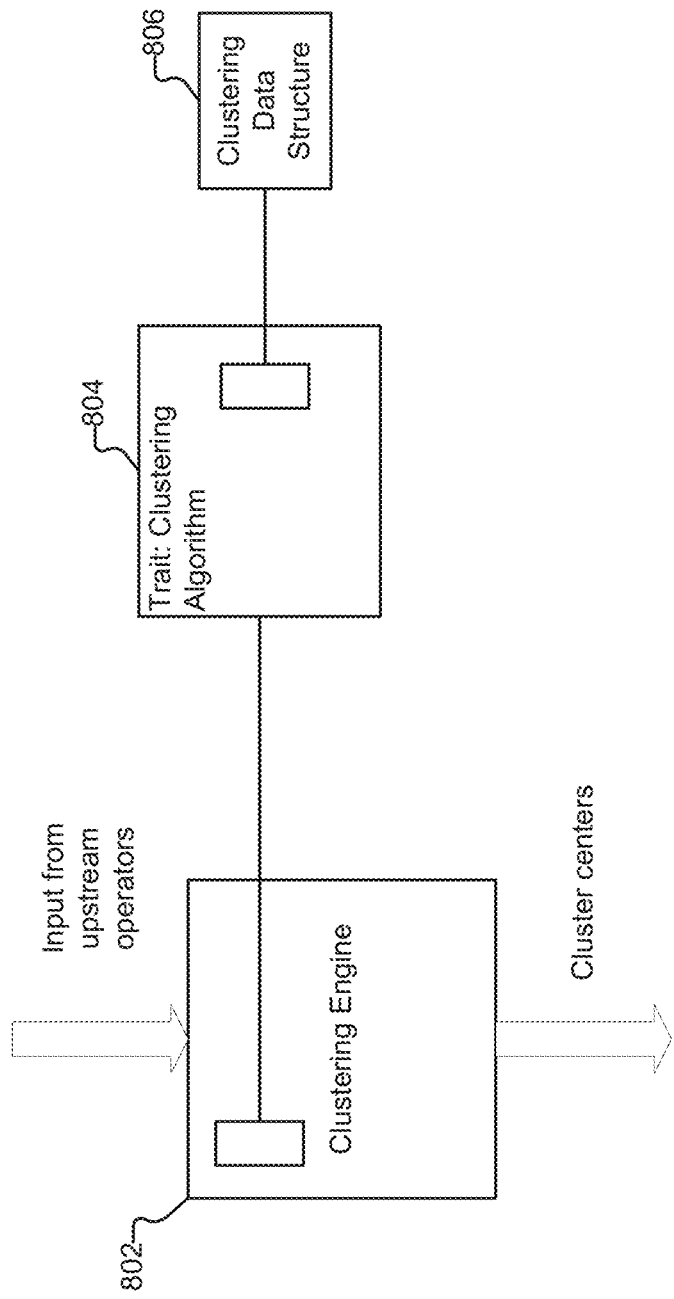
FIG. 8 illustrates an embodiment of an operator pipeline for implementing the LogReduce Values operator.

FIG. 8 illustrates an embodiment of an operator pipeline for implementing the LogReduce Values operator. In some embodiments, the operator pipeline shown in FIG. 8 is implemented by structured log analysis engine 118 of platform 102. Clustering engine 802 is configured to cluster input structured data. The clustering engine is configured to take the input from upstream operators and generate cluster centers. In some embodiments, the clustering engine uses a trait clustering algorithm 804, which is configured to cluster categorical data streams. In some embodiments, the trait clustering algorithm defines the requirements that any categorical stream clustering algorithm/models should satisfy. In some embodiments, the requirements include protocols to initialize the state of the clustering algorithm and update underlying data structures (i.e., the cluster centers) as data is being fed as a result of the algorithm, and also perform bookkeeping of the resulting data structure (e.g., estimating true data cardinality, estimating data structure memory, etc.). In some embodiments, the trait clustering algorithm 804 utilizes a clustering data structure 806. In some embodiments, the clustering data structure keeps track of the frequency of key-value pairs seen in the logs for each cluster. The facilitates more efficient lookup of which keys and values are commonly associated with a cluster. In one embodiment, the clustering data structure is implemented as a two-level hash map of keys—>values and values—>counts. The clustering data structure may also prune key-value pairs that occur rarely in a cluster and are thus not associated with the cluster.

The LogReduce Values operator described herein may be used for interactive searches. The following is an example interactive search. An embodiment of a workflow for the structured LogReduce Values operators is shown below:

_sourceCategory=aws/cloudtrail
|json_sourceCategory="aws/cloudtrail/production" and _collector="AWS"
|json "eventName", "eventSource", "awsRegion", "userAgent", "userIdentity.type", "managementEvent", "readOnly"
|logreduce values fields=eventName,eventSource,awsRegion,userAgent In some embodiments, the LogReduce Values operator ignores default fields such as message and time fields unless the field is specified as a parameter. In some embodiments, since message and time are unlikely to be categorical data, the clustering algorithm may not be able to meaningfully use these fields to cluster log lines.

The following are example parameters to the LogReduce Values operator.

'fields', (required in some embodiments): takes as input a list of column values which is a subset of input column values. In some embodiments, LogReduce Values is run on this subset of fields if the parameter is not specified.

The following are example inputs and outputs to the LogReduce Values operator:

One example of an input to the LogReduce Values operator is data in a tabular format. In some embodiments, input to the LogReduce Values operator includes non-aggregate data that is output from upstream operators (e.g., output from parsing JSON, CSV, XML, and other parsed formats). In some embodiments, in response to a "start" element (that specifies the start of the data stream to be queried), a clustering data structure is initialized, and building of the clustering data structure is started. In some embodiments, in response to receiving a "plus" element (e.g., actual data payload elements, such as actual log elements), an element is routed to the prebuilt structure, where the structure is updated with the element. In some embodiments, in the data payload (e.g., "plus" case), an element is a single row of the table, representing the log message and its current extracted fields. As one example, it may be implemented as a Scala Map[String, Any] where the field names are the keys. In some embodiments, in response to receiving a "flush" element, the current histogram centers are outputted as aggregate output. In some embodiments, the "flush" element is a control element that indicates that the user interface wants to obtain partial results to show the user of the analysis in progress. One example output from the LogReduce Values operator is the histogram centers as an aggregate output. In some embodiments, the output is provided in response to receiving an "end" element. In some embodiments, the "end" element is a control signal indicating that all data elements have been sent and that the final analysis/query can be completed.

The following are example parameters of LogReduce Values:

Fields: the columns that the user wants to use to cluster the data

Output_threshold: a number (e.g., between 0 and 1) that indicates the minimum frequency a key-value pair can have in order to be output. For example, if a customerID of 0000000000000000A only shows up in 20% of logs in a cluster, then an output_threshold of 0.2 and above will suppress this key-value pair from showing up in the output.

In some embodiments, on returning histogram centers, a histogram may be represented by one or more of the following example options:

1. Key-value pairs where the keys are, for example, JSON keys, and the values are the mode of the categorical distribution.
2. Key-value frequency pairs—this includes dumping the approximate histogram object into, for example, a JSON object schema.

The following is an example of an output schema. For example, the output of the user defined query (in which the LogReduce Values operator is expressed) may have the following example schema:

Histogram representation: To show the cluster centers
Count: Number of logs in the cluster
Cluster Label: these include labels generated and assigned to the histogram/cluster centers as they are formed, and would, for example, start at 1 and go up to the number of clusters
QuickLink: link to the logs in the specific cluster—
In some embodiments, this encodes the mode of the histogram cluster representation in a search "quicklink" URL (uniform resource locator), which points to a search query with the fields as the mode of the histogram
In some embodiments, this uses an operator (also referred to herein as the LogReduce Values-details operator) associated with LogReduce Values to further drill down into results, including to link to the cluster shortcode for that specific cluster which would be used to obtain logs which fall into that cluster. Further details regarding the "details" operator are described below.

Example Embodiments Regarding the LogReduce Values-Details Operator

In some embodiments, upon finishing clustering and creating the approximate histograms, the serialized representations of the clustered histograms are written to a temporary location, in an S3 bucket. In some embodiments, while serializing, the hyper-parameters of the clustering algorithm are written, as well as the location and identity of target clusters in the drill down URL.

In some embodiments, the output clusters from the LogReduce Values operator are clickable via a drill down URL in the quicklink part of the output, and use the LogReduce Values-details operator described herein to fetch the histogram of the corresponding cluster and rerun the clustering algorithm against the histogram fetched and filter out all logs which do not fall in that cluster as defined, for example, by the hyper-parameters (e.g., distance/threshold).

In some embodiments, if the user wants to drill down on a particular LogReduce values query identifier and cluster identifier, a link, such as shown in the example below, may be provided that leads to the following query.

_sourceCategory="aws/cloudtrail/production" and _collector="AWS"
|json "eventName", "eventSource", "awsRegion", "userAgent", "userIdentity.type", "managementEvent", "readOnly"
|logreduce values-details<shortcodeID>iclusterId=<cluster id>]

In some embodiments, if the user wants to label the raw logs by their cluster ids for further processing, they can use the following example query:

_sourceCategory="aws/cloudtrail/production" and collector="AWS"
|json "eventName", "eventSource", "awsRegion", "userAgent", "userIdentity.type", "managementEvent", "readOnly"
|logreduce values-details<shortcodeID>
| . . .

The following are example parameters to the LogReduce Values-Details Operator:

'shortcode id': this may be used to link to the serialized histograms and fetches them. Once fetched, they may be used to re-cluster the logs in the same query and match them to their respective clusters "cluster_label": In some embodiments, the cluster label is passed as a query parameter to the LogReduce Values-Details Operator which can take either a list of labels as a parameter where, for example, it only matches the logs against the histograms of those labels or no labels where all logs are returned with a new field which is the cluster label, on which the LogExplain operator described herein may be ran downstream. In some embodiments, for drilling down, the cluster label to this operator is passed, which returns non-aggregated output of all logs with that cluster label.

In some embodiments, to account for the amount of time that S3 objects stay alive, a TTL (time to live) for each object is set by default. In some embodiments, if a user runs the same query multiple times, that is treated as a regular search query being run multiple times.

LogReduce Values-Details Operator: Input and Output

Example Input: In some embodiments, the input is in a "table-in" (e.g., tabular) format. The input may include non-aggregate data that is output from upstream operators. This may include the output of parsing JSON, CSV, XML, and other parsed formats. In some embodiments, on receiving the START element (e.g., a control signal that indicates/specifies the start of the data stream to be queried, as described above), the clustering data structure is loaded using a shortcode URL and reading a serialized version from S3. In some embodiments, on receiving the PLUS element, the element is routed to the loaded data structure, the right cluster is assigned to it, and a new field (e.g., called "cluster") is added to the input data element, thereby adding a new column called "cluster" to the incoming logs after inferring the cluster using the precomputed histograms using the shortcode ID S3 mechanism. In some embodiments, on receiving the FLUSH element, the logs are outputted with the additional "cluster" column added to the log line.

Example Output: In various embodiments, the output includes non-aggregated output, with the same schema as the input format, but, for example, added with an extra "cluster" column which denotes cluster membership.

Example Drill Down State Representation

In some embodiments, for the drill down operator, the state of a previous structured log clustering query is stored. In some embodiments, the following may be performed:

1. Store the serialized cluster histograms. The serialized histograms may be sufficient to reassign the raw logs into the same cluster by computing the similarity measure for each log for each cluster.
2. Store the message identifiers (ids). The message ids allow for past messages to be perfectly grouped by their cluster by, for example, joining the raw dataset on their message ids.

Option 2 may lead to a faster implementation and may more reliably retrieve the same logs that were previously assigned to a cluster. Option 1 may be much less space intensive than option 2.

Example Embodiments of Clustering a Data Structure

In some embodiments, each stream node has a map of (customer, query/session) key vs an instance of the clustering algorithm for the pair.

In some embodiments, this structure is an in-memory data structure.

In some embodiments, the clustering algorithm handles the data access layer of cluster data objects—in this example case, an approximate histogram.

In some embodiments, the approximate histogram for each cluster is represented by a two-level tree of hash maps where primary keys (level 1) correspond to json/csv keys and secondary keys (level 2) correspond to possible values a json/csv key is paired with. In some embodiments, for each primary and secondary key, the frequency is stored of key-value pairs for logs assigned to the cluster and the maximum error incurred from pruning.

In some embodiments, the clustering data structure supports the following example operations:

trait ClusterHistogram {
   def add(event_key: String, event_name: String): Unit
   def get_frequency_estimate(event_key: String, event_name: String): Int
   def get_mode_estimate: Map[String, Tuple2[String, Int]]

In some embodiments, an example of an internal, cluster histogram structure in the following format is displayed.

Example primary key:
{'secondary key 1': (frequency, max error), 'secondary key 2': (frequency, max error), . . . }

Example of Data Structure on a Synthetic Dataset:
eventVersion:
{'1.05': (24, 0)}
userIdentity.type:
{'IAMUser': (24, 0)}
userIdentity.accountId:
{'************':(24, 0)}
userIdentity.accessKeyId:
{'': (24, 0)}
userIdentity.userName:
{'**********': (24, 0)}
eventTime:

{'2019-12-01T17:49:50Z': (3, 0), '2019-12-04T17:49:50Z': (1, 0), '2019-12-08T17:49:51Z': (1, 0), '2019-12-10T17:49:50Z': (23, 0))

sourceIPAddress:

{'\*\*\*.\*\*\*.\*\*.\*\*': (9, 0), '\*\*.\*\*\*.\*\*.\*\*\*': (15, 0)} userAgent:

{'Mozilla/5.0 (Windows NT 10.0; WOW64; rv:48.0) Gecko/20100101 Firefox/48.0': (24, 0)}

. . .

recipientAccountId:

{'\*\*\*\*\*\*\*\*\*\*\*\*\*\*': (24, 0)}

Further Details Regarding Clustering

In some embodiments, there is a limit on the number of clusters. For example in some embodiments, the number of signatures produced by the algorithm is no more than O(logn) where n is the number of data points clustered.

In some embodiments, clustering mode collapse is prevented. Mode collapse may occur when a large majority of the data points are allocated to one or two clusters. For example, the first cluster contains nearly 80% of logs in the dataset. In addition, this cluster provides no insight into the data since there is no associated signature with the cluster.

The following is a first example of categorical attribute clustering, where attributes, as used herein, refer to key-value pairs in structured logs.

This example clustering method involves leveraging information from categorical attributes in structured logs.

In some embodiments, to cluster logs based on categorical attributes, a distance function is first defined that equally takes into account logs of various structured schema. An example distance function for illustrative purposes is a variant of the K-modes distance function that accounts for schema differences between JSON logs. For example, let X and Y be two flattened, JSONlogs with not necessarily the same schema. Structured log X contains keys from set $K_X$ and structured log Y contains keys from set $K_Y$. In some embodiments, the distance function between flattened JSONs is defined as follows:

$$d(X, Y) = \frac{1}{|K_X \cup K_Y|}\left(\sum_{k \in K_X \cap K_Y} 1\{X_K \neq Y_K\} + \gamma |K_X \oplus K_Y|\right)$$

where $\oplus$ denotes the symmetric difference and $\gamma >= 1$ denotes $\oplus$ additional cost incurred if a key is missing from either schema. In this example, dividing by the union schema is performed to account for the fact that structured logs with large schemas are more likely to have more uncommon fields and thus larger distances. In some embodiments, if this term is not included, logs with a small number of attributes are more likely to be grouped together despite having different schemas or attributes. In some embodiments, to cluster the logs, a streaming k-modes clustering algorithm may be used.

In some embodiments, once the logs are clustered, signatures may be found by taking the mode of all json fields that exist within a cluster. In some embodiments, the mode of a particular field should be contained in a certain percent of logs within that cluster in order for it to be included in the signature. In some embodiments, the minimum intra-cluster frequency is known as the minimum support (which in practice is usually >90%). As used herein, "support" refers to the frequency of an attribute in a group of logs. In some embodiments, the minimum support controls how many keys are reported to the user, but may also filter out rarely seen keys that are not represented by the majority of logs grouped by a cluster.

If single clusters grow too large, then finding the mode may become both time and space intensive. In some embodiments, to reduce the time and space complexity, recently processed logs are stored in tree data structures that have a one-to-one correspondence with each cluster. These tree structures are referred to herein as "replay trees." In some embodiments, replay trees store counts of attributes contained in logs grouped by a cluster. If the replay tree grows too large, periodic pruning of the tree may be performed so that attributes that have not been seen enough within a specified timeout are deleted until that attribute is observed again. In some embodiments, to compute the signature, the tree is processed in post-order, keeping track of the most common attribute with frequency greater than the minimum support. Note this means that logs contained in a cluster may not completely match their signature if the minimum support is less than 100%.

Example

Suppose the following example dataset of three structured logs:

Log 0 {'a': 'apple', 'b': 'banana', 'c': 'cookies', 'd': {'i': 'dinosaur', 'o': 'dough'}}

Log 1 {'a': 'apple', 'b': 'bike', 'c': 'cookies', 'd': {'i': 'dinosaur', 'o': 'dodo'}}

Log 2 {'a': 'apple', 'b': 'bike'. 'c': 'chocolate'. 'd': 'deep'}

The following example cluster signatures are output:

Cluster 0 {'a': 'apple'. 'c': 'cookies', 'd': {'i': 'dinosaur'}}

Cluster 1 {'a': 'apple'. 'b': 'bike', 'c': 'chocolate', 'd': 'deep'} where log 0 and log 1 belong to cluster 0 and log 2 belongs to cluster 1. Here are observations that suggest that the cluster output is a reasonable clustering result:

Log 2 had a different schema than log 0 and log 1 since the key 'd' contains a string value instead of a nested JSON. Allocating log 2 to its own cluster is the best choice.

Since log 2 is in its own cluster, the signature should match log 2.

Cluster 0, shared by log 0 and log 1, only contains keys that overlap between the two logs.

CloudTrail Example:

The following is an example output from 100,000 logs of CloudTrail data.

Number of clusters: 8

Count: 37466

('eventVersion': '1.05', 'userIdentity': {'type': 'AssumedRole', 'accountId': '00000000000', 'sessionContext': {'attributes': {'mfaAuthenticated': 'false'}, 'sessionIssuer': {'type': 'Role', 'principalId': 'ADFLJDFALSDKLFJASLDKLFJ', 'arn': 'arn:aws:iam::00000000000:role/us2-cloudcollector-role-for-instance-profile', 'accountId': '00000000000', 'userName': 'us2-cloudcollector-role-for-instance-profile'}}},'eventSource': 'sts.amazonaws.com', 'eventName': 'AssumeRole', 'awsRegion': 'us-east-1', 'userAgent': 'aws-sdk-java/1.11.587 Linux/4.15.0-1045-aws OpenJDK_64-Bit_Server_VM/25.222-b10 java/1.8.0_222 scala/2.11.12 vendor/Private_Build', 'requestParameters'; {'roleSessionName': 'sumologic', 'durationSeconds': 3600}, 'eventType': 'AwsApiCall', 'recipientAccountId': '00000000000'}
Count: 23729

------

('eventVersion': '1.05', 'userIdentity': 'type': 'AssumedRole', 'accountId': '00000000000', 'sessionContext': {'attributes': {'mfaAuthenticated': 'false'}, 'sessionIssuer': {'type': 'Role', 'principalId': 'ADFLJD-FALSDKLFJASLDKLFJ', 'arn': 'arn:aws:iam::00000000000:role/us2-cloudcollector-role-for-instance-profile', 'accountid': '00000000000', 'userName': 'us2-cloudcollector-role-for-instance-profile'}}},'eventSource': 'sts.amazonaws.com', 'eventName': 'AssumeRole', 'awsRegion': 'us-east-1', 'requestParameters': {'roleSessionName': 'sumologic', 'durationSeconds': 3600}, 'eventType': 'AwsApiCall', 'recipientAccountId': '00000000000'}

------

Count: 10439
{'eventVersion': '1.05', 'userIdentity': {'type': 'AssumedRole', 'accountId': '00000000000', 'sessionContext': {'attributes': {'mfaAuthenticated': 'false'}, 'sessionIssuer': {'type': 'Role', 'accountId': '00000000000'}}}, 'eventSource': 'sts.amazonaws.com', 'eventName': 'AssumeRole', 'awsRegion': 'us-east-1', 'requestParameters': {'roleSessionName': 'sumologic', 'durationSeconds': 3600}, 'eventType': 'AwsApiCall', 'recipientAccountId': '00000000000'}
Count: 9522

------

{'userIdentity': {'accountId': '00000000000'}, 'awsRegion': 'us-west-2', 'eventType': 'AwsApiCall', 'recipientAccountId': '00000000000'}

------

Count: 7492
{'userIdentity': {'type': 'AssumedRole', 'accountid': '00000000000', 'sessionContext': {'sessionissuer': ('type': 'Role', 'principalId': '00000000000', 'arn': 'arn:aws:iam::00000000000:role/hcvault', 'accountId'; '00000000000', 'userName': 'hcvault'}, 'attributes'; {'mfaAuthenticated': 'false'}}}, 'awsRegion': 'us-west-2', 'sourceIPAddress': '54.193.127.227', 'userAgent': 'aws-sdk-java'1.11.587 Linux/3.13.0-123-generic OpenJDK_64-Bit_Server_VM/25.111-b14 java/1.8.0_111 scala/2.11.12 vendor/Oracle_Corporation', 'eventType': 'AwsApiCall'. 'recipientAccountId': '00000000000'}

------

Count: 4985
{'eventVersion': '1.05', 'userIdentity': {'type': 'AssumedRole', 'accountid': '00000000000', 'sessionContext': {'attributes': {'mfaAuthenticated': 'false'}, 'sessionIssuer': {'type': 'Role', 'accountId': '00000000000'}}}, 'eventSource': 'sts.amazonaws.com'. 'eventName': 'AssumeRole, 'awsRegion': 'us-east-1', 'userAgent': 'aws-sdk-java/1.11.587 Linux/4.15.0-1048-aws OpenJDK_64-Bit_Server_VM/25.222-b10 java/1.8.0_222 scala/2.11.12 vendor/Private_Build', 'eventType': 'AwsApiCall', 'recipientAccountId': '00000000000'}

------

Count: 4484
{'eventVersion': '1.05', 'userIdentity': {'type': 'AssumedRole', 'accountId':'00000000000','sessionContext': {'attributes': {'mfaAuthenticated': 'false'}. 'sessionissuer': {'type': 'Role', 'principalId': '0000000000000'. 'arn': 'arn:aws:iam::00000000000:role/prod-cloudcollector-role-for-instance-profile', 'accountid': '00000000000', 'userName': 'prod-cloudcollector-role-for-instance-profile'}}}, 'eventSource': 'sts.amazonaws.com', 'eventName': 'AssumeRole', 'awsRegion': 'us-east-1', 'requestParameters': {'roleSessionName': 'sumologic', 'durationSeconds': 3600}, 'eventType': 'AwsApiCall', 'recipientAccountId': '00000000000'}

------

Count: 1883
{'userIdentity': {'type': 'AssumedRole', 'principalId': '00000000000:vault-aws-AutoscaleBox-developer-sts-2222222222-2222', 'arn': 'arn:aws:sts:: 00000000000:assumed-role/hcvault/vault-aws-AutoscaleBox-developer-sts-1111111111-1111', 'accountid': '00000000000', 'accessKeyId': 'ASIA5PJ3ID4S6DR3COH3', 'sessionContext': ('sessionissuer': {'type': 'Role', 'principalid': 'AROAIMLL434MSBIJMBJGQ', 'arn': 'arn:aws:iam::00000000000:role/hcvault', 'accountId': '00000000000'. 'userName': 'hcvault'}, 'attributes': {'creationDate': '2019-09-18T19:04:34Z', 'mfaAuthenticated': 'false'}}}, 'awsRegion': 'us-west-2', 'sourceIPAddress': '54.193.127.227', 'userAgent': 'aws-sdk-java/1.11.587 Linux/3.13.0-123-generic OpenJDK_64-Bit_Server_VM/25.111-b14 java/1.8.0_111 scala/2.11.12 vendor/Oracle_Corporation', 'eventType': 'AwsApiCall', 'recipientAccountId': '0000000000'}

------

Total Count: 100000
Example for Dealing with Mode Collapse
In some embodiments, mode collapse may be dealt with by the following example actions:

- Increase the slack on the number of clusters as the number of data points processed increases. Mode collapse can be a result of overly constraining the number of clusters to be smaller than necessary.
- Increase penalty on missing keys. Large clusters tend to have less attributes in their signatures due to the minimum support threshold criterion. If the penalty on missing keys is increased, then logs are less likely to be matched with signatures with a low number of attributes.
- Decrease hyperparameters that encourage clusters to collapse.
- Divide by the union of keys in the loss function. Large clusters tend to have signatures with a low number of keys. Points are less likely to match with small clusters since dividing by the union of keys within flattened structured logs that is compared is performed.

Example Extensions

- In some embodiments, clustering on categorical fields is supported. One example extension is to support clustering on normalized numerical and string values.
- Reduce instances of redundant signatures. A signature is redundant of another signature if one signature contains a subset of attributes contained in another signature.
- Reduce number of singleton clusters. Singleton clusters are clusters that only contain a single log. When one data point is allocated to its own cluster, the signature represented by that cluster is just the log line itself. In general, singleton clusters are undesirable especially if they commonly occur, unless outliers are being intentionally surfaced to users/customers.

Figure 9:
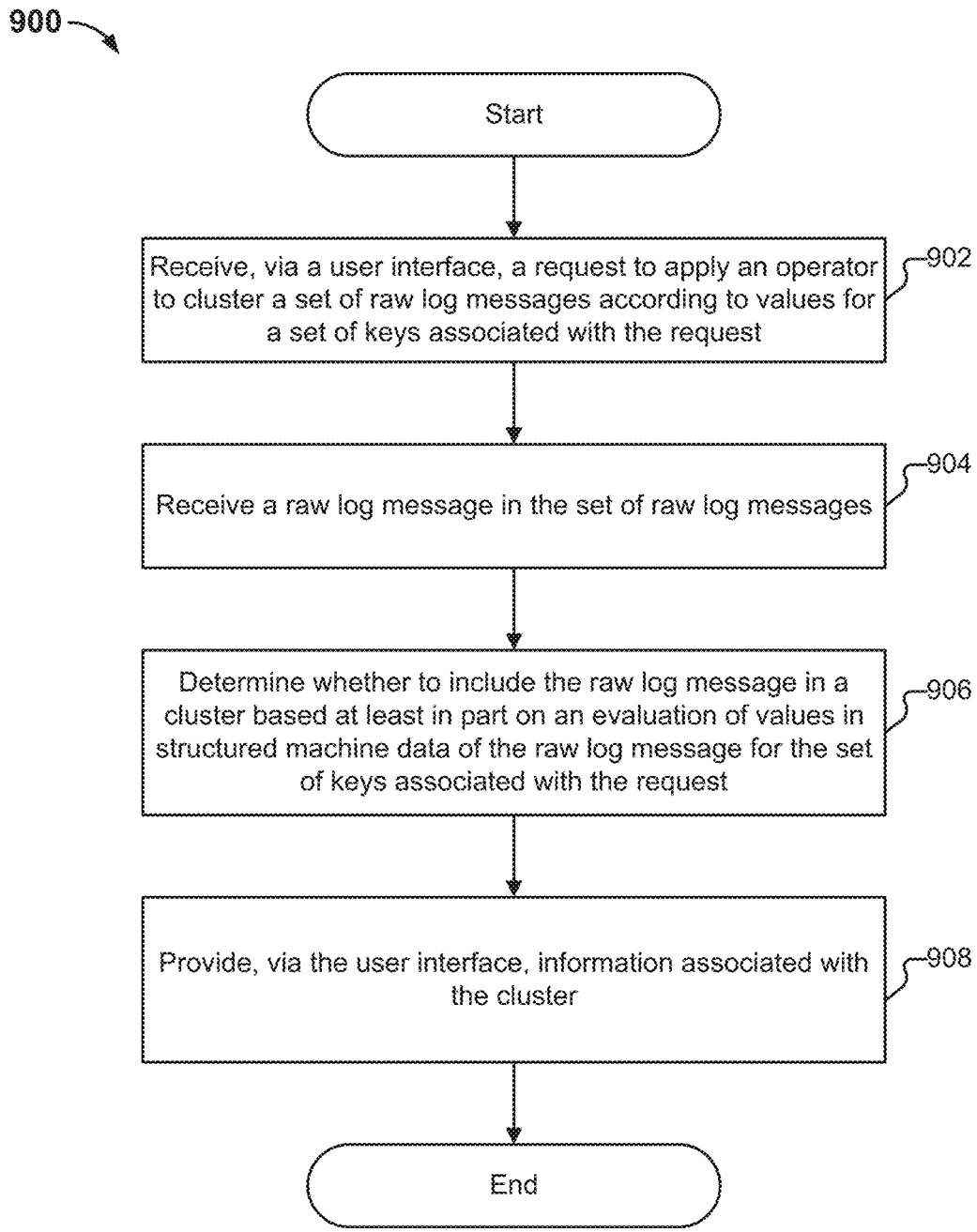
FIG. 9 is a flow diagram illustrating an embodiment of a process for clustering structured log data by values.

FIG. 9 is a flow diagram illustrating an embodiment of a process for clustering structured log data by values. In some embodiments, process 900 is executed by platform 102 of FIG. 1. In some embodiments, process 900 is executed in response to a user invoking the LogReduce Values operator described herein. The process begins at 902 when a request is received, via a user interface, to apply an operator to cluster a set of raw log messages according to values for a set of keys associated with the request. At least a portion of each raw log message comprises structured machine data that includes a set of key-value pairs. At 904, a raw log message in the set of raw log messages is received. At 906, it is determined whether to include the raw log message in a cluster based at least in part on an evaluation of values in the structured machine data of the raw log message for the set of keys associated with the request. The cluster is included in a plurality of clusters. Each cluster in the plurality is associated with a different combination of values for the set of keys associated with the request. At 908, information associated with the cluster is provided via the user interface.

Figure 4E:
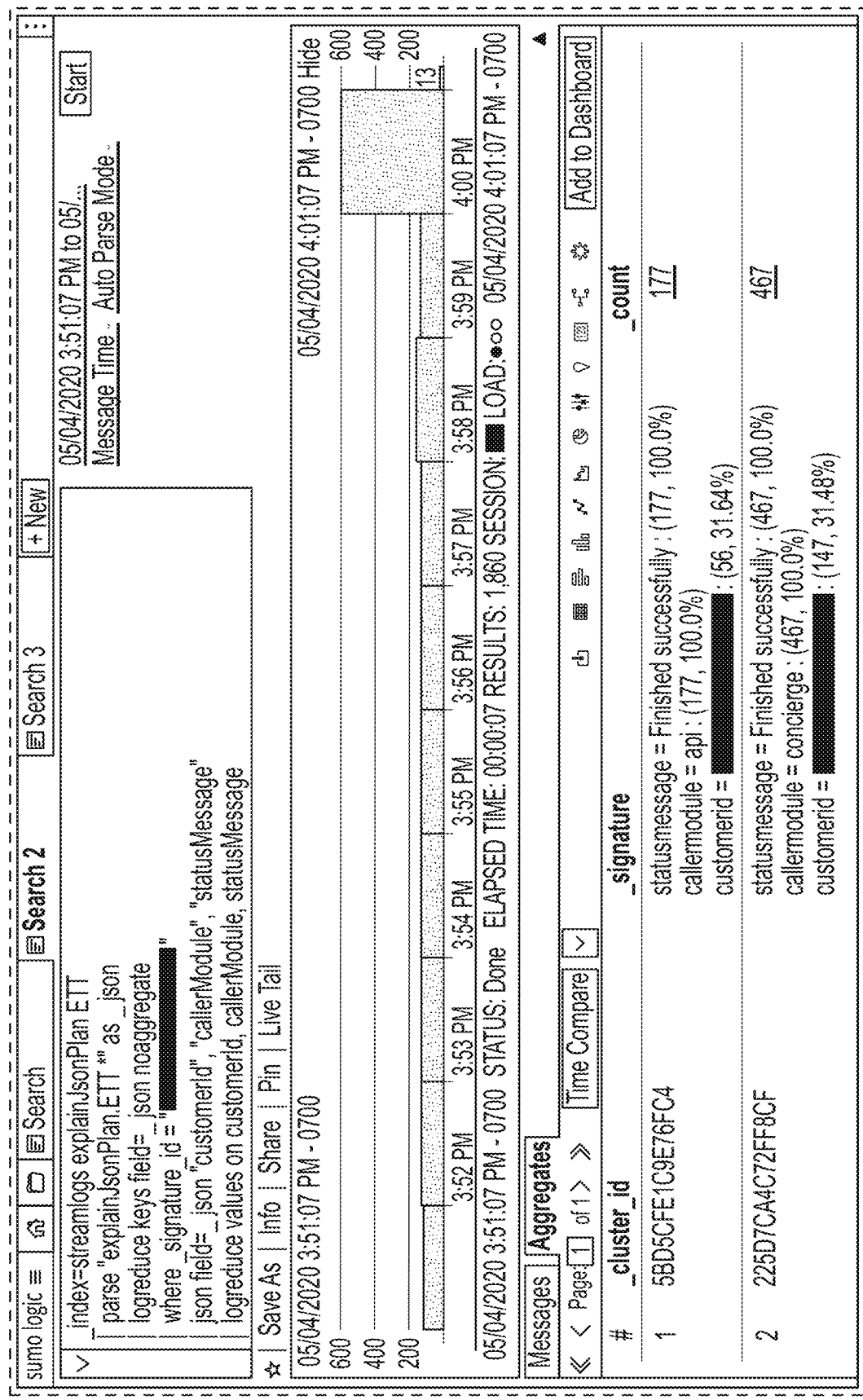
Figure 4F:
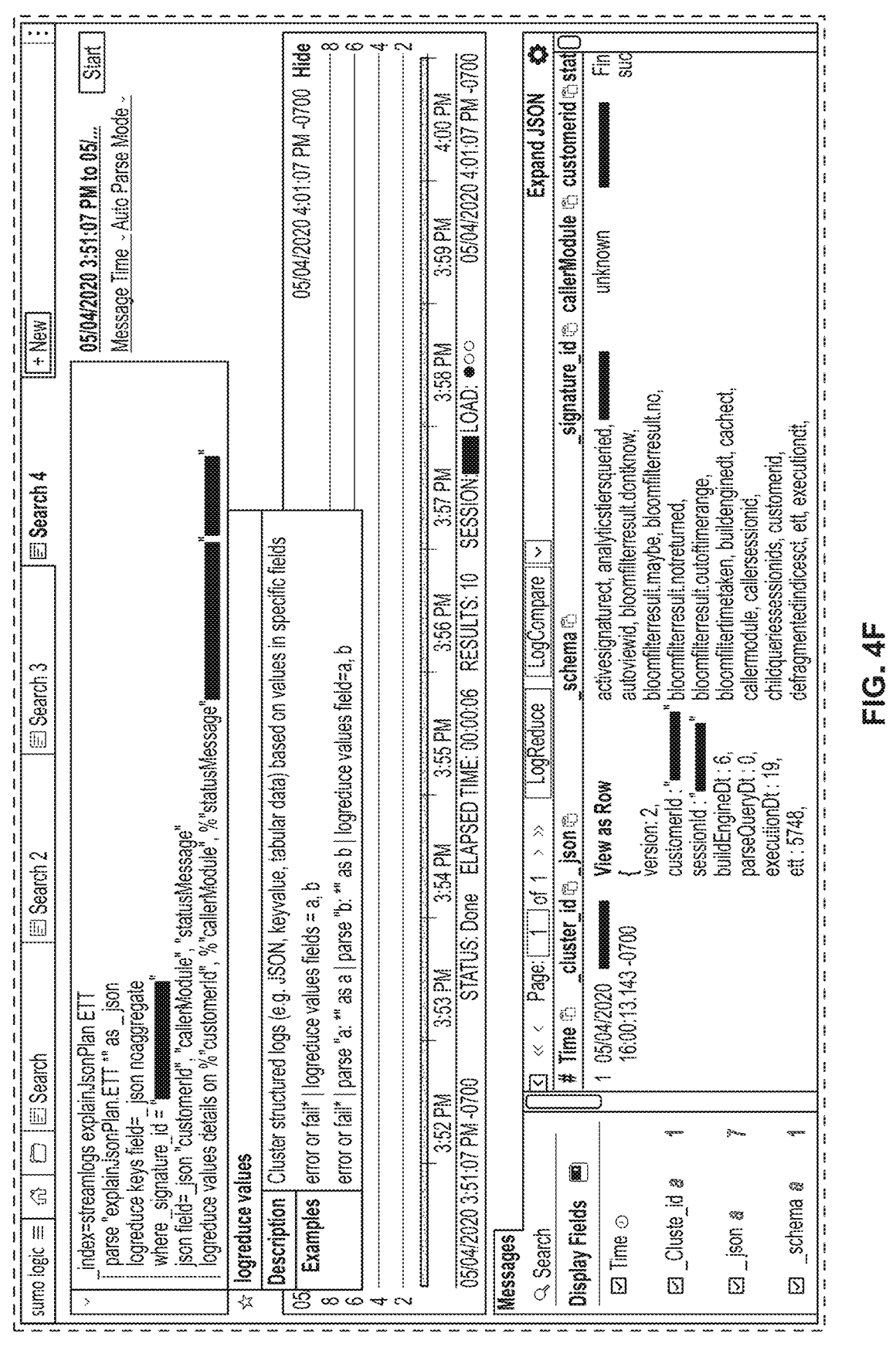
Figure 4G:
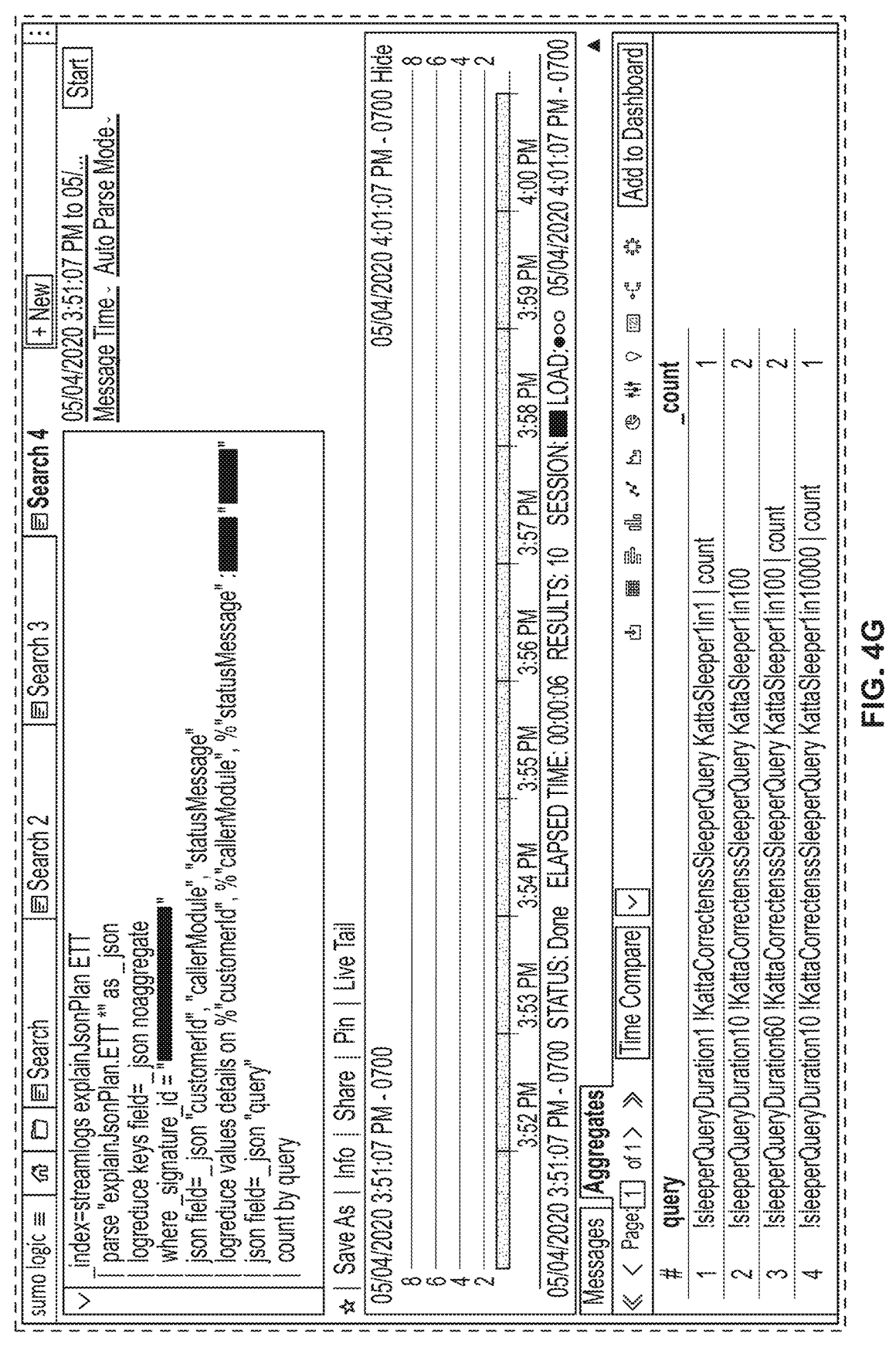
Figure 10A:
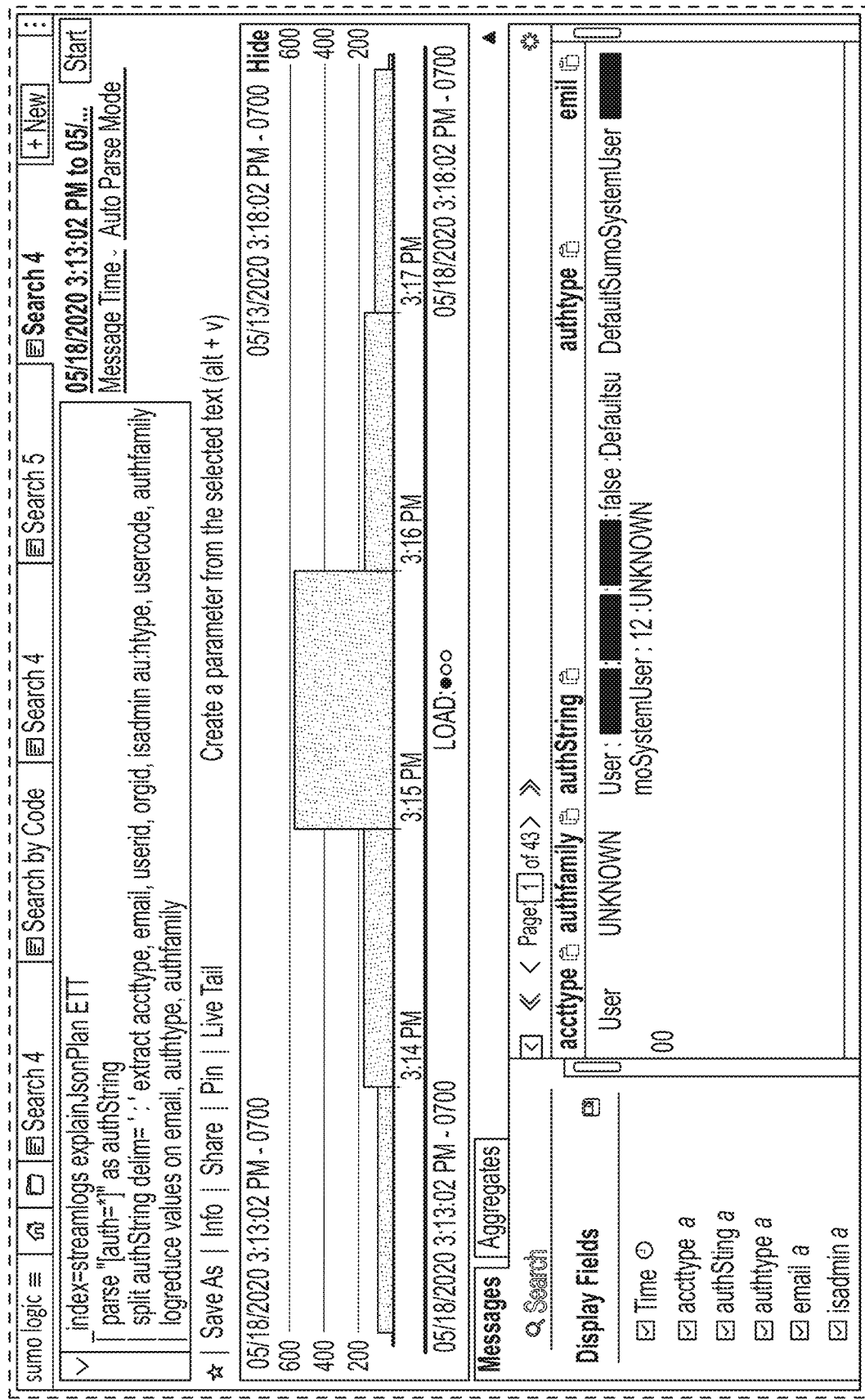
FIGS. 10A and 10B illustrate embodiments of a CSV formatted input raw log.

The following are examples illustrating various portions of process 900. Examples involving JSON and CSV format cases are described below for illustrative purposes. In some embodiments, unless separate JSON and CSV cases are specifically mentioned, the below apply to both formats.
JSON FIG. 4E illustrates an embodiment of input raw log data that can be operated on by the LogReduce Values operator. In some embodiments, the same input as in the LogReduce Keys example above may be used.
CSV FIGS. 10A and 10B illustrate embodiments of a CSV formatted input raw log.

The following are examples of user input using the LogReduce Values operator:
JSON
  _index=streamlogs explainJsonPlan ETT
  |parse "explainJsonPlan.ETT *" as _json
  |json field=_json "customerId", "callerModule", "statusMessage"
  |logreduce values on customerId, callerModule, statusMessage
CSV/Delimited
Csv/Delimited
  _index=streamlogs explainJsonPlan ETT
  |parse "[auth=*]" as authString
  |split authString delim=':' extract accttype, email, userid, orgid, isadmin, authtype, usercode, authfamily
  |logreduce values on email, authtype, authfamily The following is an example of how values are obtained for the structured log data in a raw log message, as well as example data structure representations for the extracted values. The above query strings illustrate example ways of how to parse the structured values out of the individual logs, after which, in some embodiments, they are represented as Map[String, String](map/dict/table of field names to their values for that particular log event). In some embodiments, to extract values in the structured data, various parsers may be applied (e.g., JSON, CSV, delimiter, key-value, xml, etc.) to convert each log into the structured key-value map representation.

Figure 10B:
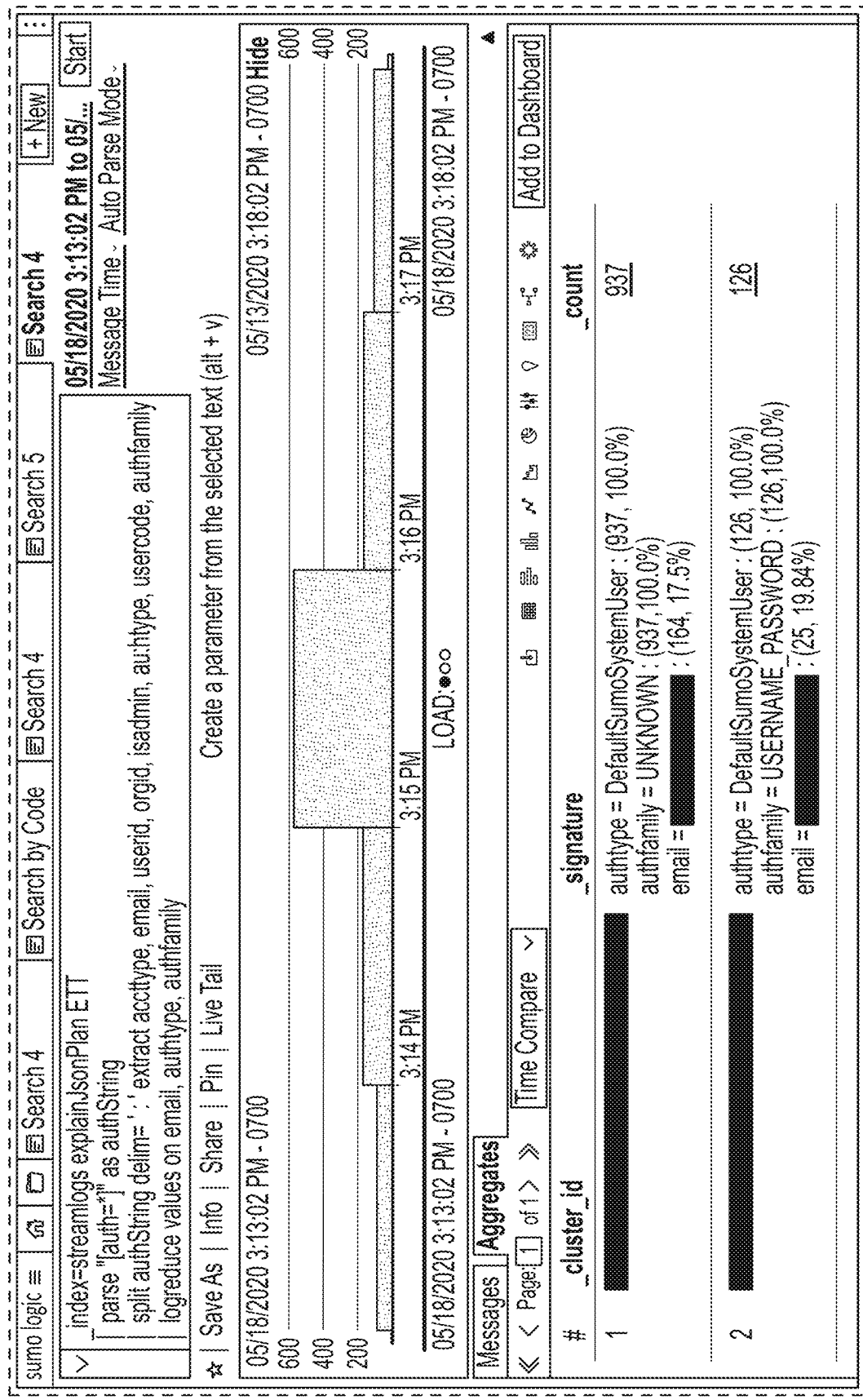

FIG. 10B illustrates an embodiment of how the extracted values are used to determine which specific cluster that a raw log message should be added to. In some embodiments, unsupervised clustering is used to determine the particular cluster in which to include the raw log message. For example, unsupervised clustering may be used to determine, given the above example Map[String,String] data structures, how to group/partition them by similarity in such a way to maximize intra-cluster similarities and minimize inter-cluster similarities.

The following is an example of how to associate a raw log message with a cluster. In one embodiment, each cluster is represented by the value count histograms for each key (for example, in Scala data structure, something such as Map [String, Map[String,Int]]—map from each key to a count map from each value to its associated frequency count) and then to define a distance function between a single log event Map[String,String] and each cluster count representation.

An incoming log is assigned to the "closest" cluster, if the similarity exceeds some threshold (T (tau) in the example below). If not, it becomes the initial member of a new cluster.

The following is an example of clustering structured log data by values: K=total number of keys

---

$N_j$ = total number of logs in cluster j
$X[k]$ = the value of k from row X
$H_j[k,v]$ = the count of key-value pair (k,v) seen in cluster j $$sim(X, Hj) = \frac{1}{KN_j} \sum_k H_j[k, X[k]]$$

Example Algorithm for LogReduce Values
Input: Stream of rows X
Result: Clusters H = {$H_1$, $H_2$, ... }
foreach row X do
  if H = ∅ then
    add X to H
  else
    k = argmin$_j$ sim(X, $H_j$);
    s = sim(X, $H_k$);
    if s > τ then
      add X to $H_k$
    else
      add X to H;
    end
  end
end

---

Figure 11:
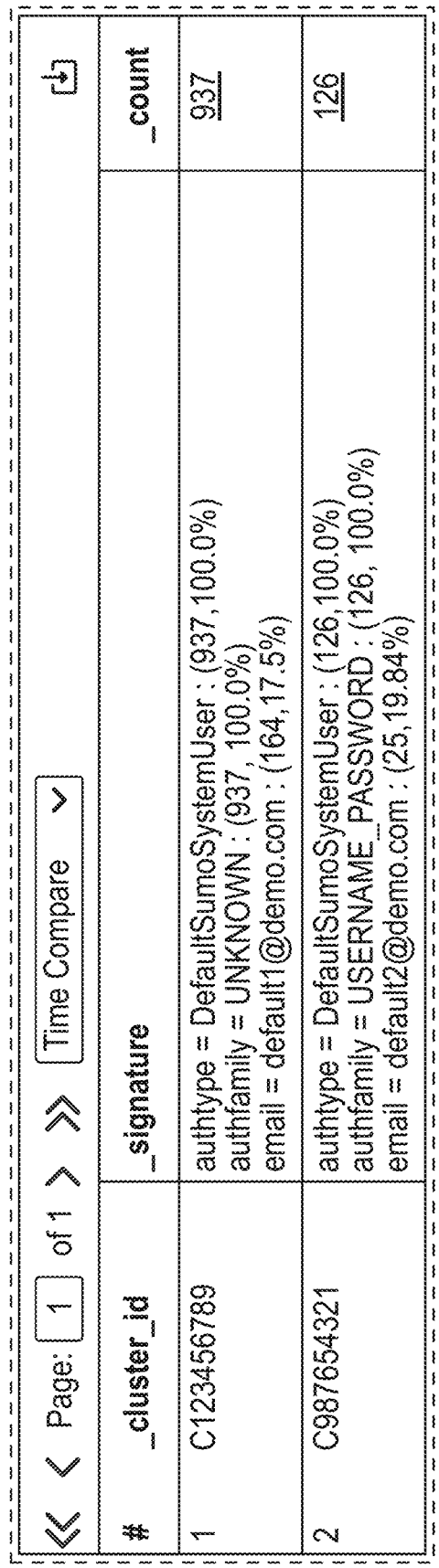
FIG. 11 illustrates an example list of information that can be provided via the UI as output of performing the LogReduce Values operator.

FIG. 11 illustrates an example list of information that can be provided via the UI as output of performing the LogReduce Values operator.

The following is an example implementation of how to highlight differences between clusters in the UI for LogReduce Values. In some embodiments, in the UI, each cluster is represented by its "prototype"—the modal (e.g., most frequent) key-value pairs for that cluster. This should give the most accurate at-a-glance "canonical" representation of the cluster contents. Also, in some embodiments, the count of the number of logs assigned to the cluster is a hyperlink that allows the user to click and directly inspect (or further query/process) the raw logs associated with that cluster.

FIGS. 4A-4G illustrate an embodiment showing interoperability of the LogReduce Keys and LogReduce Values operators described herein. In this example, the LogReduce Key's and LogReduce Values have been stitched together (e.g., applied sequentially, with LogReduce Values after LogReduce Keys) to discover/investigate unusual query behavior (e.g., unknown caller module).

The following is an example of running the LogExplain operator described herein. A SecOps (Security Operations) user may wish to detect compromised user credentials for Windows machines.

SecOps Insight: A hacked credential will display a remote login pattern (eventdata_logontype=10) where a given user logs into more machines than they usually do, based on eventid=4624 (login successful). Suppose in this example that the user wants to baseline 14 days of remote access activity and detect outliers in the most recent 24 hours.

The following is an example of running LogExplain to investigate outliers;

_sourceCategory=OS*Windows* eventid=4624 eventdata_logontype=10
    |where !isBlank(eventdata_targetusername) && !isBlank(eventdata_workstationname)
    |logexplain (now( )—_messagetime<86400000) on eventdata_workstationname, eventdata_targetusername In this example, the user need only examine a small set of results (e.g., as compared to if querying using existing approaches). In this example, the LogExplain operator is able to detect users which were very active 14 days ago but are no longer or less active recently. This is important as hackers may have left the network by the time Sec Ops chooses to run any of these queries. As shown in this example, the LogExplain query is easy for non-power users to create and assess as compared to existing approaches.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method comprising:
receiving a request to organize a plurality of log messages into clusters based on keys included in the plurality of log messages, each log message comprising machine data in a set of key-value pairs, each key-value pair comprising a key and a value for the key, each cluster being defined by a key schema that comprises a unique plurality of keys that are contained in each of the log messages of the cluster, wherein each cluster corresponds to a unique combination of keys;
for each log message from the plurality of log messages:
calculating a distance from the keys in the log message to keys in the log messages already in the clusters; and
assigning the log message to an existing cluster when the distance from the keys in the log message to the keys in any of the log messages in the existing cluster is less than or equal to a predetermined threshold, or creating a new cluster with the log message when the distance from the log message to any of the log messages already in clusters is greater than the predetermined threshold; and
presenting, in a user interface (UI), information about the clusters, the information comprising the unique plurality of keys for the log messages in each cluster.

2. The method as recited in claim 1, wherein presenting information about the clusters further comprises:
presenting, in the UI, a number of logs in each cluster.

3. The method as recited in claim 1, wherein presenting information about the clusters further comprises:
presenting, in the UI, the keys associated with each cluster.

4. The method as recited in claim 1, further comprising:
providing an option in the UI to perform second clustering for any of the presented clusters based on the values for the keys of the log messages in the cluster.

5. The method as recited in claim 4, further comprising:
providing an option in the UI to specify keys of interest to perform the second clustering according to the values of the specified keys of interest.

6. The method as recited in claim 1, wherein presenting information about the clusters further comprises:
presenting, in the UI, an option to present changes in cluster message count over time.

7. The method as recited in claim 1, wherein presenting information about the clusters further comprises:
presenting, in the UI, an option to review messages for clusters that are newly identified before and after a timestamp.

8. The method as recited in claim 1, wherein the calculating the distance includes utilizing a K-modes distance function for key schema differences between log messages.

9. The method as recited in claim 1, wherein presenting information about the clusters further comprises:
presenting, in the UI, a link to view log messages included in each cluster.

10. The method as recited in claim 1, further comprising:
calculating a signature for each cluster by taking a mode of all JSON fields within the cluster.

11. A system comprising:
a memory comprising instructions; and
one or more computer processors, wherein the instructions, when executed by the one or more computer processors, cause the system to perform operations comprising:
receiving a request to organize a plurality of log messages into clusters based on keys included in the plurality of log messages, each log message comprising machine data in a set of key-value pairs, each key-value pair comprising a key and a value for the key, each cluster being defined by a key schema that comprises a unique plurality of keys that are contained in each of the log messages of the cluster, wherein each cluster corresponds to a unique combination of keys;
for each log message from the plurality of log messages:
calculating a distance from the keys in the log message to keys in the log messages already in the clusters; and
assigning the log message to an existing cluster when the distance from the keys in the log message to the keys in any of the log messages in the existing cluster is less than or equal to a predetermined threshold, or creating a new cluster with the log message when the distance from the log message to any of the log messages already in clusters is greater than the predetermined threshold; and
presenting, in a user interface (UI), information about the clusters, the information comprising the unique plurality of keys for the log messages in each cluster.

12. The system as recited in claim 11, wherein presenting information about the clusters further comprises:
presenting, in the UI, a number of logs in each cluster.

13. The system as recited in claim 11, wherein presenting information about the clusters further comprises:
presenting, in the UI, keys associated with each cluster.

14. The system as recited in claim 11, wherein the instructions further cause the one or more computer processors to perform operations comprising:
providing an option in the UI to perform second clustering for any of the presented clusters based on the values for the keys of the log messages in the cluster.

15. The system as recited in claim 14, wherein the instructions further cause the one or more computer processors to perform operations comprising:

providing an option in the UI to specify keys of interest to perform the second clustering according to the values of the specified keys of interest.

16. A non-transitory machine-readable storage medium including instructions that, when executed by a machine, cause the machine to perform operations comprising:

receiving a request to organize a plurality of log messages into clusters based on keys included in the plurality of log messages, each log message comprising machine data in a set of key-value pairs, each key-value pair comprising a key and a value for the key, each cluster being defined by a key schema that comprises a unique plurality of keys that are contained in each of the log messages of the cluster, wherein each cluster corresponds to a unique combination of keys;

for each log message from the plurality of log messages:
calculating a distance from the keys in the log message to keys in the log messages already in the clusters; and
assigning the log message to an existing cluster when the distance from the keys in the log message to the keys in any of the log messages in the existing cluster is less than or equal to a predetermined threshold, or creating a new cluster with the log message when the distance from the log message to any of the log messages already in clusters is greater than the predetermined threshold; and presenting, in a user interface (UI), information about the clusters, the information comprising the unique plurality of keys for the log messages in each cluster.

17. The non-transitory machine-readable storage medium as recited in claim 16, wherein presenting information about the clusters further comprises:

presenting, in the UI, a number of logs in each cluster.

18. The non-transitory machine-readable storage medium as recited in claim 16, wherein presenting information about the clusters further comprises:

presenting, in the UI, keys associated with each cluster.

19. The non-transitory machine-readable storage medium as recited in claim 16, wherein the machine further performs operations comprising:

providing an option in the UI to perform second clustering for any of the presented clusters based on the values for the keys of the log messages in the cluster.

20. The non-transitory machine-readable storage medium as recited in claim 19, wherein the machine further performs operations comprising:

providing an option in the UI to specify keys of interest to perform the second clustering according to the values of the specified keys of interest.

* * * * *

UNITED STATES PATENT AND TRADEMARK OFFICE
CERTIFICATE OF CORRECTION

PATENT NO. : 12,086,021 B2
APPLICATION NO. : 18/299218
DATED : September 10, 2024
INVENTOR(S) : Saxena et al.

Page 1 of 1

It is certified that error appears in the above-identified patent and that said Letters Patent is hereby corrected as shown below:

On the Title Page

Item (72), in "Inventors", in Column 1, Line 5, delete "Tca," and insert --TCA,-- therefor Signed and Sealed this
Fourth Day of November, 2025

John A. Squires
*Director of the United States Patent and Trademark Office*